United States Patent
Ochoa

(10) Patent No.: US 7,127,733 B1
(45) Date of Patent: Oct. 24, 2006

(54) SYSTEM FOR BI-DIRECTIONAL VOICE AND DATA COMMUNICATIONS OVER A VIDEO DISTRIBUTION NETWORK

(75) Inventor: Carlos Gonzalez Ochoa, Mexico City (MX)

(73) Assignee: Rice Ingenieria S.A. De C.V. (MX)

( * ) Notice: Subject to any disclaimer, the term of this patent is extended or adjusted under 35 U.S.C. 154(b) by 0 days.

(21) Appl. No.: 09/098,997

(22) Filed: Jun. 17, 1998

(30) Foreign Application Priority Data

Jun. 19, 1997 (MX) ..................................... 974,481

(51) Int. Cl.
*H04N 7/16* (2006.01)
*H04N 7/167* (2006.01)
*H04N 7/08* (2006.01)

(52) U.S. Cl. .......................... 725/27; 725/25; 725/135; 348/468

(58) Field of Classification Search .................. 725/74, 725/78–85, 105–131, 143–151, 22, 25–31, 725/135–142, 39–61; 380/226, 278, 43; 348/460–469
See application file for complete search history.

(56) References Cited

U.S. PATENT DOCUMENTS

| | | | |
|---|---|---|---|
| 4,008,369 A | | 2/1977 | Theurer et al. |
| 4,600,921 A | * | 7/1986 | Thomas ...................... 340/5.74 |
| 4,739,510 A | * | 4/1988 | Jeffers et al. ................ 380/234 |
| 4,862,268 A | * | 8/1989 | Campbell et al. ........... 348/463 |
| 4,928,168 A | | 5/1990 | Iwashita |
| 4,947,244 A | | 8/1990 | Fenwick et al. |
| 4,994,908 A | | 2/1991 | Kuban et al. |
| 5,029,207 A | * | 7/1991 | Gammie ...................... 380/228 |
| 5,247,575 A | * | 9/1993 | Sprague et al. ................. 380/9 |
| 5,455,619 A | | 10/1995 | Truckernmiller et al. |
| 5,488,411 A | | 1/1996 | Lewis |

(Continued)

FOREIGN PATENT DOCUMENTS

MX 974481 6/1997

(Continued)

OTHER PUBLICATIONS (Nellist, John G.; Understanding Telecommunications & Lightwave Systems; IEEE press; 1996; Chapters 4 & 12, pp. 21-28 & 89-113).*

(Continued)

*Primary Examiner*—Chris Kelley
*Assistant Examiner*—Reuben M. Brown
(74) *Attorney, Agent, or Firm*—Fellers, Snider, Blankenship, Bailey & Tippens, P.C.; Terry L. Watt

(57) ABSTRACT

The present invention relates generally to an apparatus for bi-directional communications of voice, data, and alarms, and simultaneous transmission of video signals over a single cable such as coax. In more particular, it applies to a communications system that utilizes coax-type cabling to offer computer related in-room guest services such as on-television screen display of their bills, etc. The instant invention utilizes a digital communications protocol, preferably PCM, to fit a plurality of general purpose communications channels within conventional broadcast television frequencies. These communication channels might variously be used to carry telephone voice data, thereby obviating the need for a separate phone network, or, more generally, they might be used to transport any sort of digital data (e.g., room billing information, outgoing faxes, etc.) The instant invention also provides a means for directing broadcast video information to specific rooms within the structure. Finally, the instant invention also accommodates the remote generation of signals/alarms and their detection and processing in a central facility.

15 Claims, 21 Drawing Sheets

U.S. PATENT DOCUMENTS

| | | |
|---|---|---|
| 5,565,908 A | 10/1996 | Ahmad |
| 5,581,270 A | 12/1996 | Smith et al. |
| 5,612,730 A | 3/1997 | Lewis |
| 5,638,426 A | 6/1997 | Lewis |
| 5,640,193 A | 6/1997 | Wellner |
| 5,642,155 A | 6/1997 | Cheng |
| 5,699,104 A * | 12/1997 | Yoshinobu .................. 725/27 |
| 5,710,815 A * | 1/1998 | Ming et al. .................. 380/20 |
| 5,761,602 A * | 6/1998 | Wagner et al. ............... 725/34 |
| 5,828,402 A * | 10/1998 | Collings ...................... 725/25 |
| 6,040,870 A * | 3/2000 | Small ......................... 348/476 |
| 6,115,818 A * | 9/2000 | Barton ........................ 713/176 |
| 6,125,259 A * | 9/2000 | Perlman ...................... 455/6.2 |
| 6,144,401 A * | 11/2000 | Casement et al. ............ 725/30 |
| 6,674,958 B1 * | 1/2004 | Wehmeyer et al. ........... 386/83 |

OTHER PUBLICATIONS

Eldering C A et al.: "CATV Return Path Characterization for Reliable Communications", IEEE Communications Magazine, vol. 33, No. 8, Aug. 1, 1995, pp. 62-69, XP000525541, New York, NY, US.

Kohiyama K et al: "Architecture of MPEG-2 Digital Set-Top Box for CATV VOD System", IEEE Communications Magazine, vol. 42, No. 3, Aug. 1966, pp. 667-671, XP000638552.

* cited by examiner

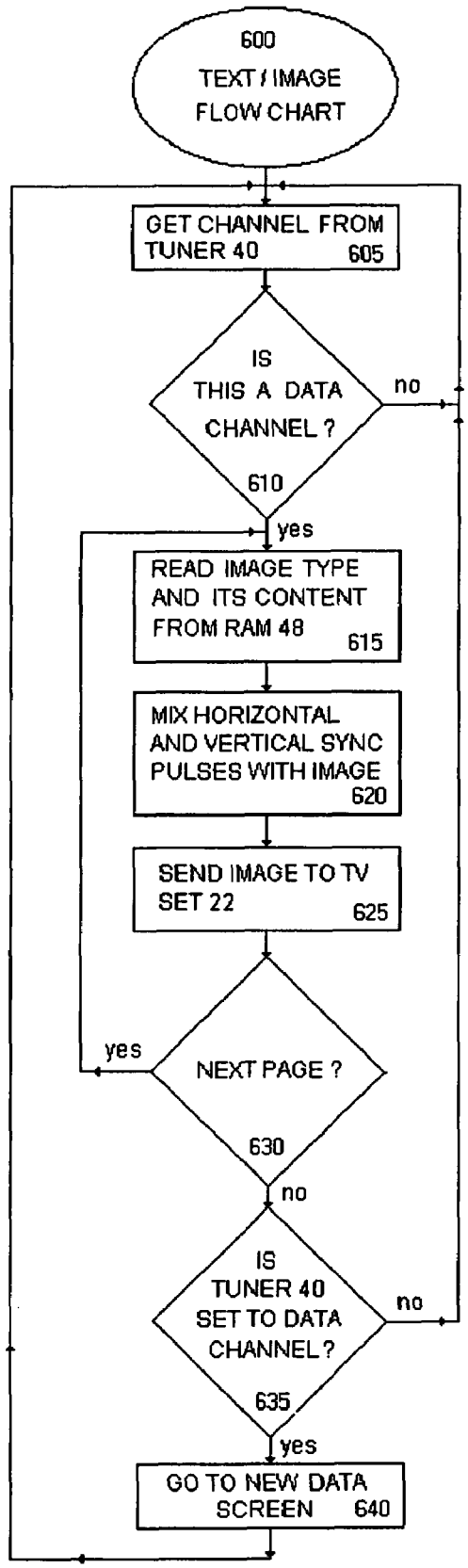

SYSTEM FOR BI-DIRECTIONAL VOICE AND DATA COMMUNICATIONS OVER A VIDEO DISTRIBUTION NETWORK

RELATED APPLICATION

This application claims the benefit of an earlier filed Mexican Patent Application No. 974,481 entitled "Sistema De Control De Canales De Video," which application was filed on Jun. 17, 1997.

FIELD OF THE INVENTION

The present invention relates generally to an apparatus for bi-directional communications of voice and data, and simultaneous transmission of video signals over a single cable such as coax. In more particular, it applies to a communications system that utilizes a coaxial wiring infrastructure such as that typically found in most houses, hotels, motels, hospitals, condominiums, etc., to offer computer related in-room services such as bi-directional voice and data communications, on-television screen transmission and display of graphic and textual information that originates at a central location, remote alarm generation and transmission back to a central monitor, etc.

BACKGROUND

Modern consumers are becoming increasingly sophisticated and demanding concerning the communications options that they expect to find in their homes, and in their hotel, motel, or hospital rooms. In more particular, newer structures may include as part of their basic infrastructure dedicated wiring connections that are designed accommodate modern phone systems and computer links. These connections make it possible, in the case of a motel or hospital, to offer a resident in-room features such as the ability to view his or her bill on the television. More generally, these links provide services such as pay-per-view movies, and advanced phone systems that offer voice mail, faxes, Internet connections, etc. Typically, the wiring that makes these in-room features possible is installed within the walls of the structure at the time the building is constructed.

Owners of structures that do not have dedicated computer wiring—as much as they might want to offer these same sorts of features to their customers—often find themselves unable to justify the cost of retrofitting their buildings to accommodate these new technologies. Rewiring a structure in which dedicated computer/communications lines have not been installed at the time of construction is usually not cost effective and raises several concerns beyond the obvious financial burden of the upgrade itself. For example, in the case of a hotel or hospital, an upgrade will likely result in a loss of revenue because blocks of rooms will need to made available to the workman during the installation; an upgrade may disrupt existing communications links; and, an in-wall installation will inevitably generate dust and dirt which tend to spread throughout the facility.

Additionally, the modern trend is toward central monitoring and control of appliances, utilities, and alarms. In more particular, "smart" buildings are becoming increasingly common, due in large part to a broadened realization of the enormous cost advantages in terms of lower staff requirements and energy savings that these sorts of improvements can bring. Smart buildings, though, require communications links between a central monitor and various remote thermostats, HVAC units, etc. Once again, many buildings that might otherwise profit by central monitoring and control of room conditions are for the most part cost-prohibited from adding this functionality, the cost of installing the necessary wiring infrastructure being for the most part not economically justifiable.

Finally, there are any number of room conditions that the hotel front desk (or hospital nurses' station, etc.) might want to monitor. For example, fire and smoke alarms should notify the front desk—in addition to sounding an alarm—so that the staff would know where the problem is. Additionally, an in-room "panic" button would allow a resident to summon help in an emergency. More mundane uses might include monitoring whether or not the in-room refrigerator has been opened (so that the staff will know whether or not to take an inventory for billing purposes); monitoring the status of the heating unit, air conditioner, lights etc. However, all of these monitors require an interconnection between the room and the front desk and might be prohibitively expensive to install after construction on the building is completed.

In the case of residential monitoring, cable companies are always looking for ways to control access to their cable systems. This might be for purposes such as offering movies-on-demand or pay-per-view in a viewer's home. Additionally, these companies seek to limit access to premium channels by those who have not paid for them. Further, most cable systems have additional signal bandwidth available within their systems that could be used for other communications purposes such as Internet access.

Even though many structures might not have the special wiring often used today, they almost invariably have at least a coaxial (coax) cable running to each room for the transmission of a television signal thereto. This is often referred to as a "closed" cable television system. The fact that each room in a hotel, hospital, etc., already has a coax line running to it suggests that this conduit might be used to upgrade the communications systems. Additionally, in residential cable systems there is a vast network of coax lines run from a central distribution center to individual homes and then a further distribution within the home to individual rooms. Given the increasing pressure to offer advanced communications options to the end user, these coax networks would, at least on their face, appear to be an attractive upgrade pathway. And, indeed, that is the approach taken by the instant invention. However, this approach is not without its problems.

First, those skilled in the art will understand that it is possible to send a wide variety of signals through a coax cable. However, a cable television network cannot usually be entirely preempted for general communications use because consumers demand television, perhaps even more stridently than they demand communications services. Thus, any communications upgrade that seeks to utilize a coax network that carries video signals must manage do so without disrupting those signals.

Additionally, coax television wiring is not well suited for communication to a single recipient: it is more suited to mass receipt of the same signal. This is because coax wiring is different from telephone wiring in that a signal that is placed into the coax backbone will potentially be available to be received in every room in the complex, whereas separate phone wires are run to each individual room. This configuration difference becomes a problem when the goal is the secure transmission over coax of confidential information to only one receiver. For example, consider the case of a lodger who wants to view the current status of his or her bill on the in-room television. That information is typically maintained within a centralized computer facility and, in order to transmit that information through coax to the room, it must be, in effect, "broadcast" from the head-end throughout the entire network. Of course, this broadcast can potentially be "received" in every room connected to the coax and it goes without saying that most residents would not want this confidential information seen by others. Thus, some provision must be made for the targeting of individual rooms so that confidential information can be selectively transmitted from a centralized location to a single remote recipient.

Finally, a similar problem exists where the direction of information transmission is from a room back to a central receiver. Once again, a transmission from a room over the coax backbone to the central receiver can potentially also be heard in every other room. Additionally, the central receiver cannot determine the source of a remote broadcast unless something about that broadcast identifies the sender.

Thus, what is needed is an invention that can provide simultaneous two-way voice and data communications over a coax cable, thereby allowing owners of buildings that do not contain dedicated computer wiring to avail themselves of advances in computer and telephone technology without rewiring. Additionally, this system should not disturb existing television broadcast signals. The system must also be able to selectively communicate with a particular remote receiver, even though every receiver hooked onto the cable network might potentially receive the message. Finally, the system should provide some means of generating alarm-type signals that originate remotely and are received and processed at a central monitoring station.

After the present invention was conceived and constructed, a patent search was conducted in the United States Patent and Trademark Office for the purpose of determining whether any similar or related solutions had been previously developed to the foregoing problems. That patent search produced the following references relating to advertising within elevators and methods of distributing short messages such as ads:

| U.S. Pat. No. | Inventor | Title | Date of Patent |
|---|---|---|---|
| 4,008,369 | Theurer et al. | Telephone Interfaced Subscription Cable Television System Especially Useful in Hotels and Motels | Feb. 15, 1977 |
| 4,928,168 | Iwashita | Billing Data Display System and Terminal Used Therein for a Closed Circuit Television System | May 22, 1990 |
| 4,947,244 | Fenwick et. al | Video Selection and Distribution System | Aug. 7, 1990 |
| 4,994,908 | Kuban et al. | Interactive Room Status/Time Information System | Feb. 19, 1991 |
| 5,455,619 | Truckenmiller et al. | Video Distribution System Addressing Device for Identifying Remote Locations | Oct. 3, 1995 |
| 5,488,411 | Lewis | Interactive System for a Closed Cable Network | Jan. 30, 1996 |
| 5,565,908 | Ahmad | Bi-Directional System for Providing Information, Management, and Entertainment Services | Oct. 15, 1996 |
| 5,581,270 | Smith et al. | Hotel-Based Video Game and Communication System | Dec. 3, 1996 |
| 5,612,730 | Lewis | Interactive System for a Closed Cable Network | Mar. 18, 1997 |
| 5,638,426 | Lewis | Interactive System for a Closed Cable Network | Jun. 10, 1997 |
| 5,640,193 | Wellner | Multimedia Service Access by Reading Marks on an Object | Jun. 17, 1997 |

The Lewis patents (U.S. Pat. Nos. 5,488,411, 5,612,730, and 5,638,426) teach an interactive system for a CCTV network. However, all of these patents rely on a separate PBX (private branch exchange) telephone system to supplement the data transmitted to the room over the coax line.

Theurer et al., U.S. Pat. No. 4,008,369, also requires separate telephone communications lines in addition to a video/coax connection, and does not offer video and voice over a single coax line.

Fenwick et al., U.S. Pat. No. 4,947,244, requires "grouped" sets of video monitors and does not provide two-way voice and data communications over a coax cable.

Kuban et al., U.S. Pat. No. 4,994,908, teaches a two-way (interactive) room status and time information over a coax or fiber optic communications link. However, Kuban does not teach how to use this same system for two-way voice communications.

Iwashita, U.S. Pat. No. 4,928,168, discloses a CCTV system that allows the user to request billing information from a central computer. However, Iwashita does not provide two-way voice and data transmission over a single cable. Similarly, Truckenmiller et al., U.S. Pat. No. 5,455,619, is concerned exclusively with distribution of video signals to a plurality of remote television receivers and uses a separable "tag" system, wherein a hardware key/microprocessor combination is placed in each room containing a television.

Smith, et al., U.S. Pat. No. 5,581,270, teaches a video game/communications system with provides for two-way data transmission using RF modems. This system does not additionally offer two-way voice and data communications over the same cable.

Wellner, U.S. Pat. No. 5,640,193, discloses how a handheld scanner pen might be used to select options over a telephone. It does not discuss how video and two-way data and voice might be sent over a single cable.

Finally, Ahmad, U.S. Pat. No. 5,565,908, teaches a system for selecting entertainment services, such as movies, from a motel room. It is not concerned with two-way voice communications.

Thus, the above-listed patents are clearly distinguishable from the present invention, a description of which is set forth below. Before proceeding to a description of the instant invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

The invention disclosed herein pertains generally to a system for providing video, as well as two-way voice and data communications, over a single cable such as a coax. It applies more particularly to a communications network—preferably for use in buildings such as houses, motels, hotels, and hospitals—wherein coaxial television cables are already drawn to each room and wherein the owner desires to upgrade the communications system without rewiring the entire facility. It also pertains to the generation of alarm-type signals that originate remotely and then are received and processed at a central monitoring facility.

According to one aspect of the present invention there is provided a system for multi-channel television transmission and simultaneous bi-directional voice and data communication over a single communications line that is most suitable for use in buildings such as homes, hotels, motels, and hospitals that have rooms pre-wired for cable television. In the preferred embodiment, communications between a centralized control system and remote units that have been placed in each room take place over a coax (coaxial) cable distribution system. Those skilled in the art will recognize that other sorts of communications conduits, such as fiber optics, might be used instead. Of course, if fiber optics were used a small amount of additional interface hardware would need to be added to the instant invention to permit it to operate with this medium.

Even though the instant invention would be very attractive for use within an older structure that has existing coaxial wiring, it should also be clear to those skilled in the art that the system would work as well with new cabling that has been pulled for that particular purpose. For purposes of specificity hereinafter, it will be assumed that coax wiring is to be used and, when that term is used hereinafter, it will be understood to mean coax wiring as well as its equivalents.

The in-room component of the instant invention—collectively the "smart video system" or "SVS"—is a "unitary" module that sits between the coax backbone and a conventional in-room television set and controls the source of the video information that appears on the television. It additionally offers a conventional phone RJ-type phone jack for attachment of a telephone, fax, modem, etc.

A first function provided by the instant invention is the transmission over coax cable of data intended for receipt by a single remote receiver/room. In the preferred embodiment, a central computer is instructed to send textual and/or graphic information to a particular room, each room having been equipped with a unitary remote module. The information is formatted and "printed" one computer screen at a time to the video RAM of a video controller, thereby producing a bit mapped image. The bit mapped image is converted by the video controller to a black and white baseband video signal, which signal will be broadcast over the coax network for receipt by the particular room. However, before this signal is transmitted a digital security key is embedded in one of the scan lines, preferably the first scan line, as a part of the image. This digital security key will be used by each room module to determine whether or not it is to capture this particular video screen of information and store it within its attached RAM, each unitary remote module having been assigned a unique key number. The baseband video signal containing the information will then be modulated to a conventional television channel, for example channel 3, and broadcast throughout the cable system. Every in-room unitary remote module in the system will receive the video broadcast, but only the module in the room for which it is intended—i.e., the module that has the pre-assigned matching digital security key number—will actually capture that image. Other modules in other rooms will ignore the transmission. The video transmission is converted to a binary digital representation within the unitary remote module and stored in an area of internal RAM for later viewing by the room occupant. When the occupant so desires, he or she will then use the unitary remote module to display the stored information on the in-room television. Needless to say, the same method could also be used to transmit and display "public" information such as the weather, public survice announcements, etc.

A second function provided by the instant invention is simultaneous two-way voice and data transmission over the same coax line. In more particular, according to another aspect of the instant invention there is provided a system for sending and receiving voice and other phone-based information over a coax line. In the preferred embodiment, the hotel or hospital will have an existing PBX switchboard to direct calls to the different rooms. The analog (or in some cases digital) voice signals from the PBX are intercepted by the head-end component of the instant invention and converted to digital signals (if they are not digital already). Then, each digital signal is encoded using PCM (pulse code modulation) and RF (i.e., radio frequency) modulation for transmission to a particular room. The transmission to a particular room is always by way of the same pre-assigned modulated PCM "channel"/"slot" combination. Thus, the in-room module, if it senses a signal arriving on its particular assigned channel and slot, will extract the digital PCM signal, convert it to analog, and then pass the analog signal on to the telephone, which telephone has been plugged into the instant in-room module. For the return trip back to the PBX, the unitary module digitizes (A/D) the incoming voice signal (or fax signal, or modem signal, etc.) and broadcasts—via modulated PCM—that digitized signal back to a head-end decoding module, the transmission back taking place on different assigned PCM channel/slot combination. When the decoding module senses a return signal, it will note the PCM slot number and, from that information, be able to pair up the outgoing signal with the incoming signal. The returning signal is then converted back to analog and passed on to the PBX. Note that by using separate PCM slots for transmission and reception it is possible to have simultaneous bi-directional data transfer.

A third aspect of the instant invention involves the generation of individual signals or alarms within a room and their transmission and receipt at a central monitoring facility. In the preferred embodiment, a variety of trip switches, pressure plates, contact and proximity switches, heat and smoke detectors, nurse "call" switches, or other binary (i.e., "on/off") switches, can be installed in the room and connected to the in-room unitary remote module. When a particular condition of interest is detected (e.g., when smoke is detected in the room, when the refrigerator is opened, when a nurse is "called," when a patient in a hospital is undergoing distress, when a HVAC unit is non-operational, etc.) a signal is generated by the in-room module. This signal might take many forms but in the preferred embodiment the signal will be a tone such as that generated by a touch-tone phone keypad. The in-room module then digitizes and transmits (via PCM) the tone in the out-going pre-assigned PCM channel and slot for that room. At the same time, a digital value which is representative of the PCM channel number in which the alarm is being sent is placed into PCM channel 16 and transmitted. Those skilled in the art will recognize that PCM channel 16 is conventionally used as an alarm channel. For purposes of the instant embodiment, channel 16 is used to indicate the PCM slot (i.e., room) that in which an alarm has been triggered.

A fourth aspect of the instant invention involves the use of the apparatus described previously to block-out or permit the viewing of specific television channels in each room. In particular, the preferred embodiment of the in-room module has the capability of displaying information that has been previously received and stored in its own memory on any given television channel, thereby replacing whatever content was introduced into the coax cable on that channel from the head-end. By sending information to a room in a manner similar to that discussed previously in connection with text transmission and by including specific directives to the unitary module as part of that information, it is possible to direct the in-room module to either display or "cover" specific channels. For example, if a guest has not paid to view a particular channel, when the television is set to view that channel the non-paying guest will see a substituted video signal that might consist of, for example, a static public service message that has previously been stored in the memory of the unitary remote unit. On the other hand, if a guest agrees to pay for access to a television channel, a command will be sent to the unitary module directing it allow that particular channel to be viewed. Thus, when the guest dials into this channel, no video substitution will take place and the guest will be able to view the ordered movie.

It is anticipated that the coax cable network will carry a normal complement of UHF and VHF television channels, which signals originate at the head-end of the system. This is in addition to the functionality provided by the instant invention. In other words, the instant invention may be added to an existing television signal distribution system without adversely impacting that function. Indeed, the instant invention will provide additional functionality to the existing television infrastructure as described below.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

FIG. 21 is a flow chart that summarizes the unitary 21 video display logic.

DETAILED DESCRIPTION OF THE PREFERRED EMBODIMENTS

Figure 1:
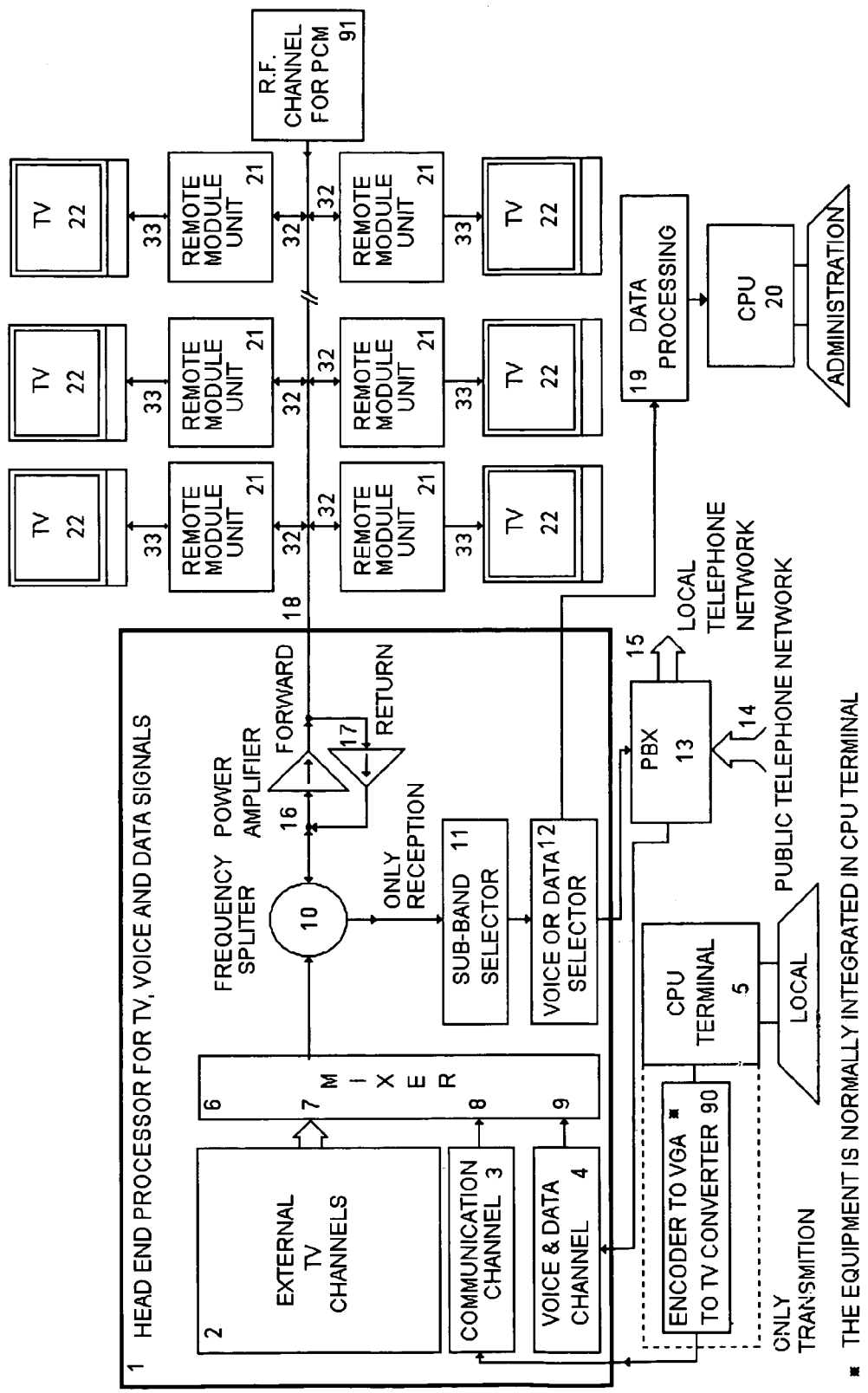
FIG. 1 is a schematic drawing that contains a broad overview of a preferred embodiment of the present invention.

Referring to the drawings in detail, wherein like numerals denote identical elements throughout the several views, there is shown in FIG. 1 a schematic drawing that provides an overview of the components of a preferred embodiment of the instant invention. For purposes of specificity in the text that follows, the instant invention will be discussed as though it has been installed in a hotel using an existing coax cabling network. However, those skilled in the art will recognize that the invention disclosed herein might be used in many different settings including, but not limited to, homes, motels, hospitals, condominiums, town-houses, etc. Hotel operators, security companies, cable companies, and Internet service providers are just some of the many potential purchasers and users of the instant invention. Additionally, in the discussion that follows the instant invention will be described as though it were operating over a conventional coax television network, although the inventor specifically contemplates that any number of other communications media might be alternatively employed.

International Standards

Since the market for the instant invention is international in scope, every effort has been made to conform its specification to meet international standards. For example, with respect to television systems, the recommendations of the CCIR (Committee Consultive International de Radiocommunications, headquartered in Geneva, Switzerland) as set in the 15$^{th}$ plenary meeting (1982) and published by the UIT (International Telecommunications Union) are followed. Additionally, the instant invention adheres to the U.S. F.C.C. standards and to those of the Mexican Industry and trade Secretary.

Transmission systems may be broadly grouped into two main frequency ranges: VHF (40 MHz to 200 MHz) and UHF (470 MHz to 1,000 MHz). Cable television systems are configured somewhat differently from wireless transmission (broadcast) systems. However, they are similar enough that both conform to the same international standards.

That being said, the instant inventor recognizes that the U.S. F.C.C. specifications (subpart A of part 76) which pertain to CATV (cable systems) do not apply to facilities with fewer than 50 subscribers nor to "multiple communication systems." Cable television transmissions may potentially cover a frequency range of 5.75 to 900 MHz.

Finally, the instant invention also utilizes a PCM transmission scheme with a capacity of up to 64 Kb/s per PCM "slot" and 32 "slots" per 2.048 MHz band. This provides sufficient bandwidth for most communications needs. In the preferred embodiment, the European PCM standard is used but, alternatively, the 24 slot U.S. PCM format could also be used.

Hardware Overview

FIG. 1 provides a hardware overview of the entire bi-directional communication/video channel control system. As is illustrated in that figure, the instant invention consists of a head-end processor 1 and support hardware, and any number of remote unitary modules 21. The interconnection between the head-end hardware 1 and the unitary modules is a coax backbone 18 or a similar communications conduit. Although the figure suggests that the head-end processor 1 is located proximate to a head-end terminus of a single coax backbone 18—and that is indeed the case in the preferred embodiment—in fact, this module might be located at any sort of central distribution site or junction where one or more coax cablels are brought together for purposes of receiving and distributing a common signal. In the text that follows, "head-end" will be used to describe the "supervisory" end of a conventional single cable coax backbone 18, as well as more complicated network topologies such as stars, etc., wherein the supervisory module might be physically placed at a distribution site, rather than at one terminus of a single cable backbone. Note that in a star topology, the coax backbone 18 might have multiple "remote" ends (i.e., ends of the coax that are away from the head-end/supervisory end).

Figure 7:
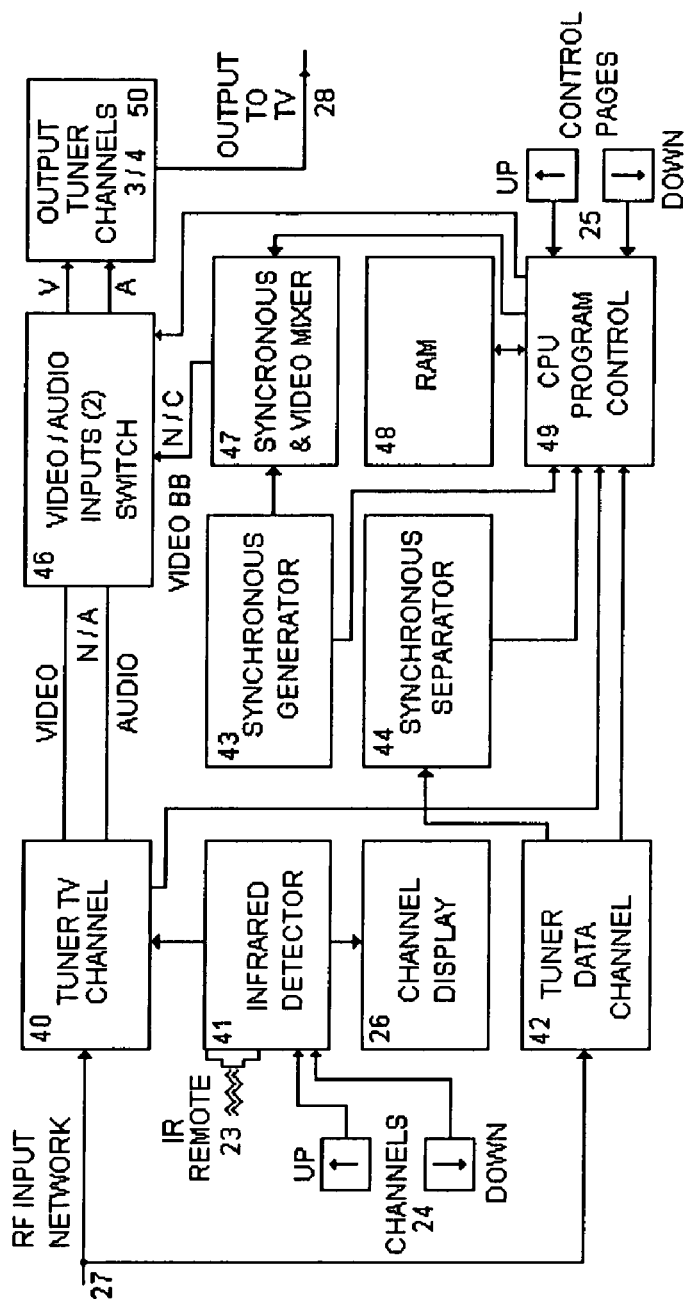
FIG. 7 is a schematic illustration of the black-and-white video channel control in the unitary remote module.

The flow of information from the head-end 1 to a room is generally as follows. A signal originates within the PBX 13 or the CPU 5. The PBX 13 signal would typically be either voice (phone call) or data (e.g., incoming fax, Internet download, etc.). Signals from the CPU 5 will be NTSC video signals from encoder 90. Separate pre-processing modules (communication channel 3 and voice and data channel 4) accept the incoming signals and prepare them for transmission out over the coax backbone 18. The output from communication channel 3 is a video signal, whereas the output from voice and data channel module 4 is a modulated and multiplexed PCM signal. The PBX 13 and CPU 5 signals are combined with an assortment of cable television channels via mixer 6 and passed through frequency splitter 10 to forward power amplifier 16. The forward amplifier 16 boosts the combined signals for transmission out onto the coax 18. The various signals—whether voice, data, or video—are sensed by the unitary remote module 21 and routed either to an attached telephone 34 (or fax, modem, etc.), an attached television 22, or stored for later display in RAM 48 (FIG. 7).

Figure 12:
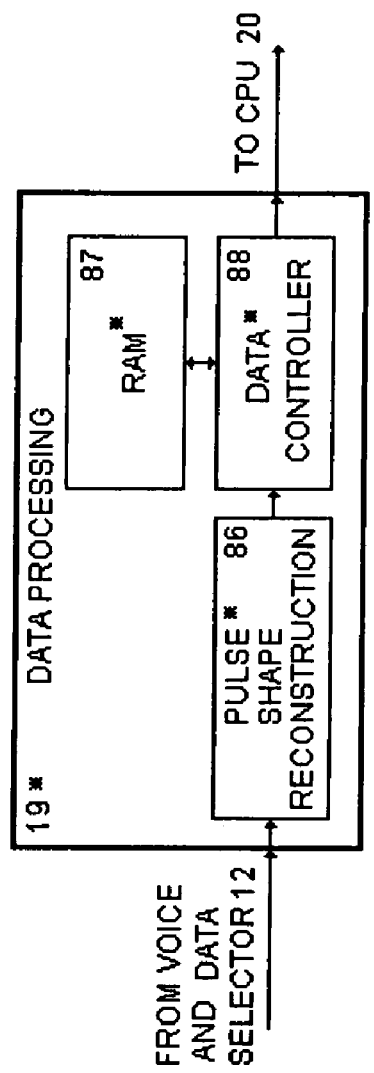
FIG. 12 contains a more detailed illustration of the various components of the data processing module 19.

The flow of information from the remote unitary modules 21 to the head-end 1 takes place as follows. A signal originates in a room. This signal might be voice from the telephone 34, data received through phone connector 29 of the unitary remote module 21 (e.g., fax, modem, etc.), or an alarm generated by a device attached to the module 21. The signal is processed by the unitary module 21 and is broadcast back out onto the coax backbone 18 as a modulated and multiplexed PCM signal. The PCM signal is received by return amplifier 17 and boosted for transmission to the frequency splitter 10, which splitter 10 is designed to separate out those frequencies (e.g., via a bandpass filter) that contain returning data and send that information on to the sub-band selector 11 for demultiplexing. The sub-band selector 11 then sends the demultiplxed information to the voice or data selector 12, which sends the telephone-related data (e.g., voice, modem, fax, etc.) back to the PBX 13 and sends any alarm signals to the alarm processing unit 19 and on to CPU 20. FIG. 12 illustrates in greater detail the components of the alarm processing unit 19, which preferably consists of a PCM pulse regenerator 86, a data controller 88, and local RAM 87.

Figure 14:
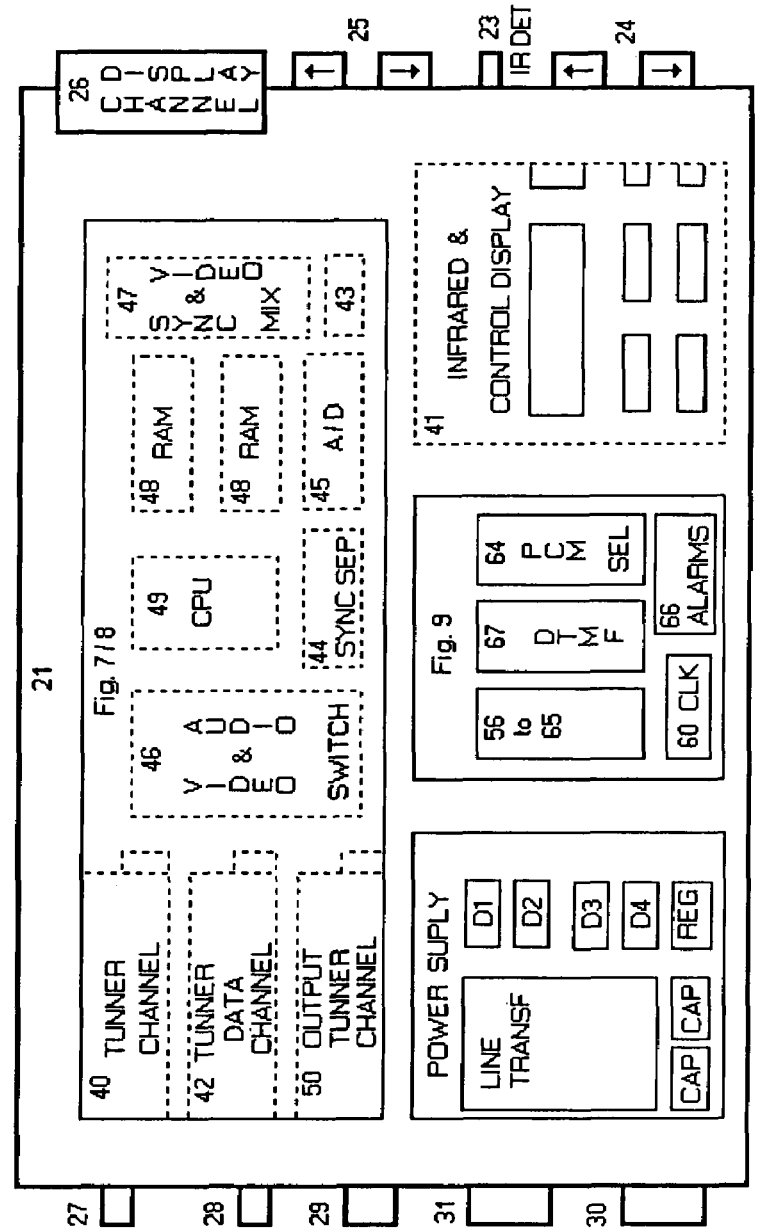
FIG. 14 contains a diagram of the color unitary module hardware components.

Finally, the preferred hardware layout of the unitary remote module 21 main logic board may be found in FIG. 14. As is illustrated in that figure, the unitary module 21 contains inputs for an infrared remote control detector 23, remote alarms 31, manual channel 24 and page 25 increment/decrement buttons, and system power 30. Its outputs include a coax out 28 for connection to an attached television 22 and a channel number display 26, preferably a liquid crystal display that indicates the channel to which tuner 40 is set. Coax connector 27 and telephone connector 29 are used for both input and output. The unitary remote module 21 contains three tuners: a variable tuner 40 that is used by the viewer to select particular channels for viewing and that passes a baseband signal to video and audio switch 46; an fixed output tuner 50 which modulates the baseband signal from video and audio switch 46 to some fixed channel, for example, channel 3 or channel 4; and a fixed tuner 42 that is used by the CPU 49 to receive text and graphic images in a manner described hereinafter. Additional circuitry includes display control circuitry 41 for the channel display 26; circuitry 41 that senses and processes directives from infrared detector 23; RAM 48, sync separator 44, A/D circuitry 45, and video sync mixer 47 for use by CPU 49; power supply circuitry; and, support circuitry for PCM communications unit 64 and the alarm transmission.

Voice Communications

Figure 18:
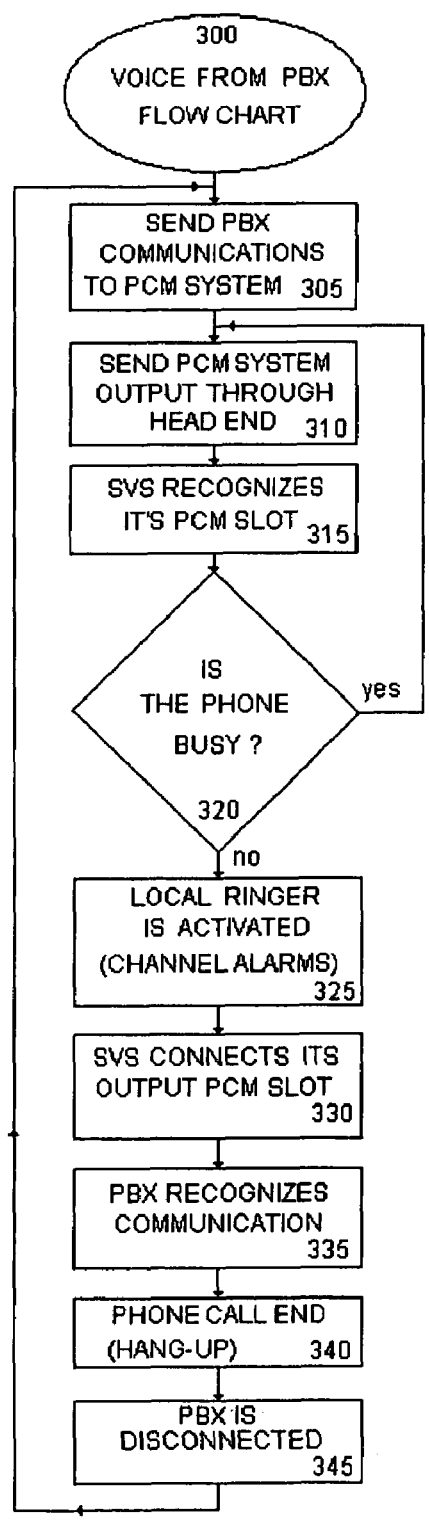
FIG. 18 contains a flow chart that illustrates how voice and data are transmitted from the PBX 13 to the unitary module 21.

Turning to FIGS. 1 and 18 wherein a first aspect of the instant invention is broadly illustrated, there is provided a system for simultaneous two-way voice and data communication over a signal distribution system such as coax cable. By way of general overview, modules 4, 11, and 12 act as a head-end transciever, through which voice and other phone data may be comunnicated with one or more remote transcievers/unitary remote modules 21. It is anticipated that the transmitted signals will arise in pairs: one signal originating at the head-end (e.g., from the PBX 13) and a corresponding signal originating at a remote end location (e.g., from the in-room telephone 34). This obviously describes a conventional two-person telephone conversation, but those skilled in the art will recognize that the same two-signal model also applies to fax transmissions with handshaking, communication via computer modem, etc.

In a typical hotel or hospital installation there will be an existing PBX 13 system for the purpose of receiving external phone calls from a public telephone system 14 and routing them to the various rooms. The PBX 13 additionally allows the residents to use room phones to obtain an "outside" line and place calls to locations outside of the hotel. Finally, a PBX 13 typically also provides for room-to-room calls, and often additionally offers provisions to signal a room that a message is waiting, etc. However, rather than using the existing PBX 13-to-room wiring—which wiring might be a twisted pair phone line—the instant invention is designed to offer telephone communications services over a coax connection in place of that wiring. It should be noted, however, that although in the preferred embodiment of the instant invention the PBX 13—to-room wiring connections are replaced by the instant invention, that is not strictly required and the existing PBX 13 system might be left partly or entirely in place and other aspects of the instant invention used instead. However, in the text that follows it will be assumed that the instant invention is to handle all phone communications tasks.

Figure 4:
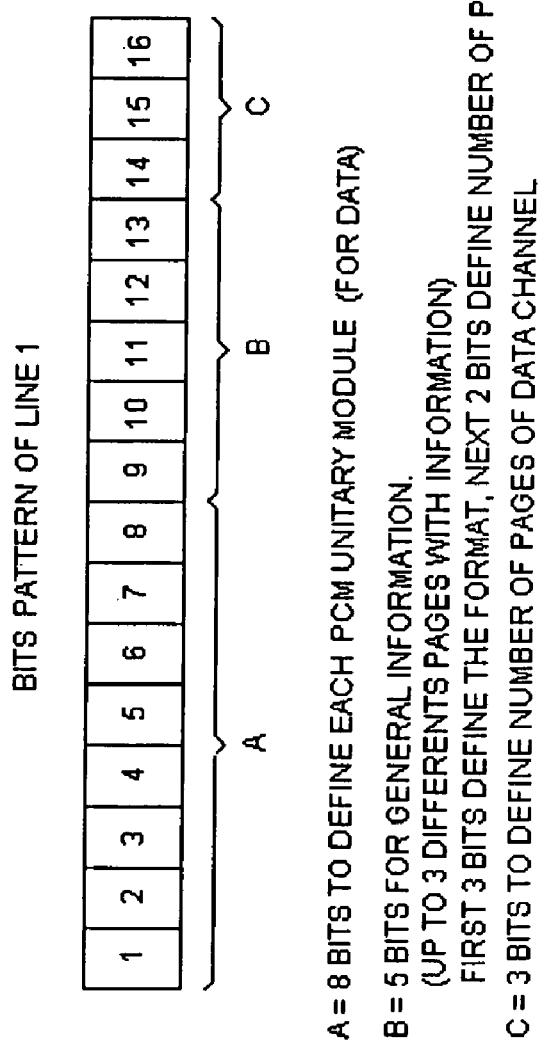
FIG. 4 illustrates how bit patterns within the first video scan line are used to direct information to a specific unitary remote module.
Figure 5:
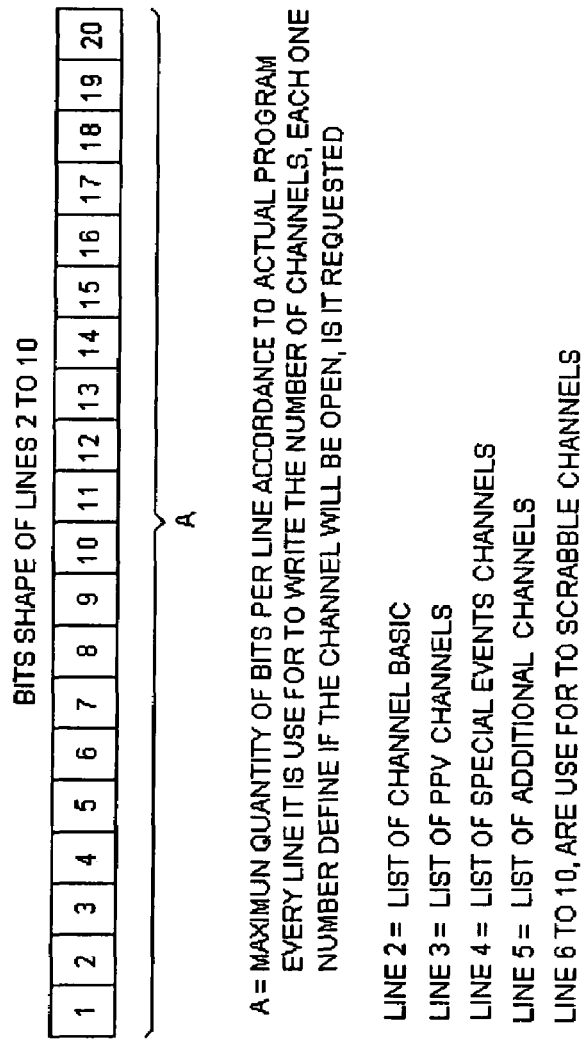
FIG. 5 illustrates the bit patterns of scan lines two to ten.

In FIGS. 1 and 4, the output (i.e., incoming) analog phone lines from the PBX 13 are connected to a voice and data module 4, the broad purpose of which is to digitize the incoming analog phone signals, provided that those signals are not already in digital format. Those skilled in the art know that modern PBX 13 units may deliver their output in a digital form such as PCM (i.e., pulse code modulation). However, for purposes of clarity in the text that follows, the assumption will be made that the output from the PBX 13 consists of multiple analog voice phone lines. It should be clear to those skilled in the art how the instant design would need to be modified in the event that the output from the PBX 13 is digital.

Figure 2:
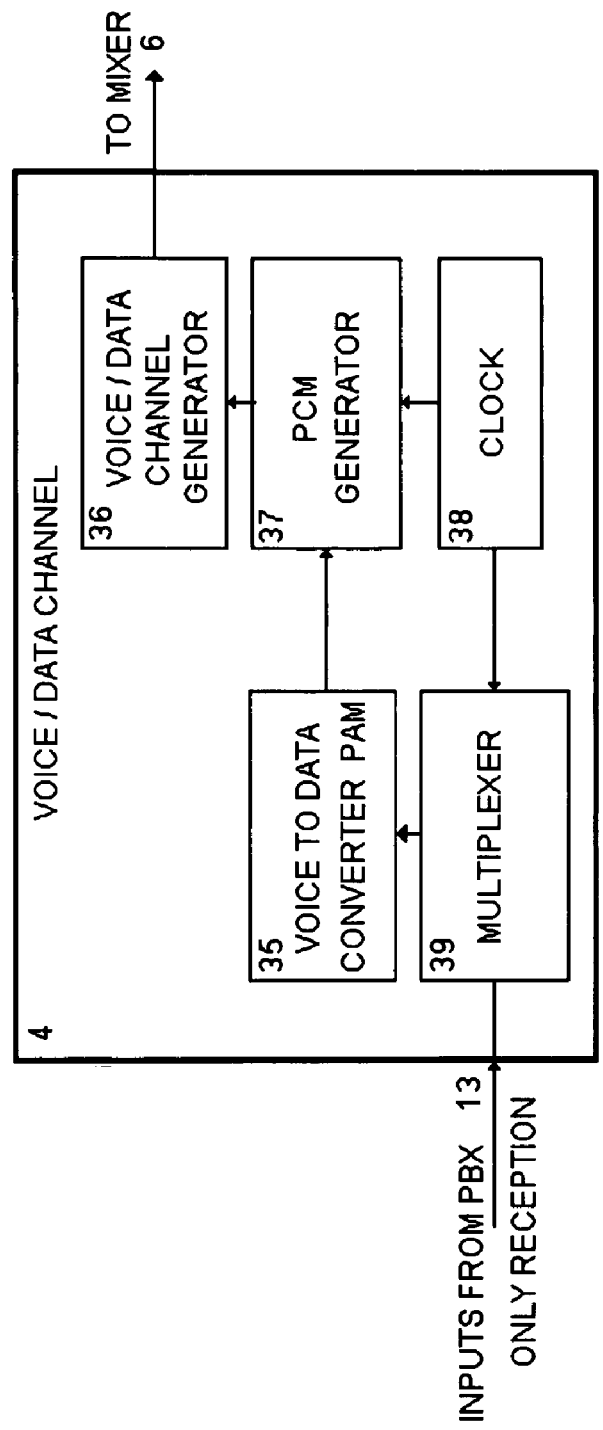
FIG. 2 illustrates in more detail the various components of the voice/data channel module 4.

As is generally illustrated in FIG. 2, within the voice and data A/D module 4 the multiple analog phone lines from the PBX 13 terminate in multiplexer 39, which multiplexer 39 time-slices the analog signals and presents them to an A/D module 35 for conversion into digital values. A preferred method of doing the conversion to digital is via a PAM algorithm (i.e., pulse amplitude modulation) although many other methods could alternatively be used. It is well known that human voice as it appears in telephone voice communications can be fairly accurately represented by frequencies in the range of 300 to 3,400 Hertz. Thus, the digitizing sample rate need be no higher than 6,800 Hertz (Nyquist), although most conventional A/D converters sample at much higher frequencies.

The output from the A/D module 35 is next presented to the PCM generator 37, wherein the now-digitized digital phone signal values are prepared for transmission to the individual rooms. The PCM generator 37 accepts the multiplexed digitized phone signals and converts them into a PCM bitstream (i.e., serial PCM) in a manner well known to those skilled in the art. The baseband output from the PCM generator 37 is next sent to the RF modulator 36, where the PCM output is modulated to radio frequencies for broadcast over the coax network. In the preferred embodiment, the outgoing PCM signal will be modulated to lie within any unused television channel, for example channel 6 could be used which lies in the 82 to 88 MHz frequency range. Alternatively, the frequency band between 72 and 78 MHz will almost always be available for outgoing transmissions as that particular interval represents the frequency "gap" between channels 4 and 5 in the conventional cable broadcast spectrum, a gap that is otherwise reserved for wireless communications in the over-the-air broadcast spectrum. That being said, since it is contemplated that the instant communications system will be used over the same coax cable as cable television, potentially any unused television channel in the frequency spectrum could be utilized to transmit the voice data.

Those skilled in the art will understand that a European-format PCM "channel," which typically spans about 2 megahertz in frequency, actually consists of 30+2 multiplexed signals which together can transmit a total of about 2.048 Mbits/sec of information. This PCM format has room for 30 "data" signals and two control or alarm signals. Alternatively, there is also a U.S. PCM format that accommodates 24 "channels" and transmits 1.8 Mbits/sec which might be used instead; however, the European 32 channel PCM format is preferred. Each of the individual multiplexed signals will be referred hereinafter as a "PCM slot" or a "slot." Thus, there are 30+2 separately-addressable multiplexed slots within each PCM channel. In the preferred embodiment, each room has two PCM slots permanently assigned to it: one for the reception of data and one for the transmission of data from the room back to a central monitor. Additionally, those skilled in the art will recognize that it is possible to have multiple PCM "channels", each occupying its own 2 megahertz bandwidth and having room for 30 voice channels: any unused television channel can potentially accommodate three such channels. Thus, it would be theoretically possible to accommodate as many PBX 13 phone lines as might likely ever be encountered by adding additional voice and data modules 4, each of which would transmit on its own 2 MHz bandwidth and carry a portion of the PBX 13 phone load.

Turning once again to FIG. 1, the now modulated PCM signal is sent to mixer 6, preferably via a coax connection. The mixer 6 is a passive element that accepts multiple coax inputs and the signals they carry. These signals are all combined into a single output source for broadcast over the coax network. In addition to the modulated PCM signals from the voice and data A/D module 4, the mixer 6 preferably also accepts a conventional coax cable television input—and its full complement of television channels—via coax connector 7.

As a next step, the combined PCM and broadcast video signals are transmitted to frequency splitter 10. This element, in the forward (i.e., outgoing or away from the head-end) direction, acts as an all-pass filter with respect to signals in the frequency range 50 MHz to 890 MHz, i.e., the conventional broadcast television bandwidth. Of course, this particular frequency interval is used for purposes of illustration only and those skilled in the art will recognize that many other intervals could be used instead.

The output from the frequency splitter 10 is next passed to a bi-directional amplifier. In the forward direction, the outgoing amplifier 16 preferably boosts signals in the 50 MHz to 890 MHz bandwidth for transmission out over the coax backbone 18. In the preferred embodiment, this frequency range includes two sorts of information. First, this frequency range covers the cable television spectrum (i.e., channels 2 to 83). Additionally, this range includes the outgoing PCM signal, discussed previously, which has preferably been modulated into the instant frequency band in a manner described above.

Of course, broadcast of the multiplexed PCM encoded incoming voice signals is only one-half of the process: these signals must also be received and decoded before they can be "heard" over a conventional telephone handset. The receiver component of this embodiment is the in-room unitary remote module 21. As is indicated in FIG. 1, the unitary remote module 21 accepts the out-of-the-wall coax cable 32 as input via coax connector 27 (FIG. 6), which would preferably be an "F" type connector. An analog modular phone connection 29 (e.g., RJ-11 compatible) is provided for connecting a standard telephone 34 to that module via data/voice via a conventional telephone wire 35.

Within the unitary remote module 21 is the electronic circuitry to convert the incoming PCM encoded voice signals to analog signals, which can be heard over the telephone 34. In more particular, and as is illustrated most clearly in FIG. 9, the coax incoming signal from the coax connector 27 is split and sent to bi-directional mixer 55 and channel selector 64. Bi-directional mixer 55 is a passive unit that merely passes the incoming PCM signal through to a channel filter 56. This element 56 contains a band pass filter designed so as to restrict the passed signal to the 2 MHz bandwidth that contains the incoming modulated PCM channel, e.g., from 72 MHz to 74 MHz. It additionally delivers a baseband PCM output to input channel selector 57, i.e., it also acts as a tuner or demodulator.

By way of explanation, in the preferred embodiment a particular PCM slot/channel combination will be permanently assigned to each remote room unit that is connected to the coax. In FIG. 2, the signal on each incoming PBX analog telephone line will always be multiplexed to the same one of the 30 available PCM slots. Additionally, the frequency to which the PCM channel is modulated is "known" to the receiving unitary device 21 (i.e., step 315 of FIG. 18). Thus, each unitary remote module 21 can be pre-programmed to only respond to a particular PCM slot at a particular modulated frequency. By this method it is possible to insure that a given incoming phone call is received only by a single room. Similarly, this room/PCM slot pairing provides a way for the central processor to recognize from which room a particular transmission has come.

Returning once again to FIG. 9, the baseband output from the channel filter 56 is next sent to PCM input channel selector 57. PCM channel selector 57 extracts from the broadcast multiplexed PCM serial signal the PCM "bits" corresponding only to a pre-assigned slot. The output from PCM channel selector 57 is next sent to a pulse regeneration module 58, the purpose of which is to regularize the PCM pulses before they are sensed and converted by the audio processor 59 back to an analog signal for transmission via port 29 to the telephone 34. The analog signal is transmitted via the phone cord 35 to a conventional analog phone where it can be heard by the listener via the handset.

Figure 15:
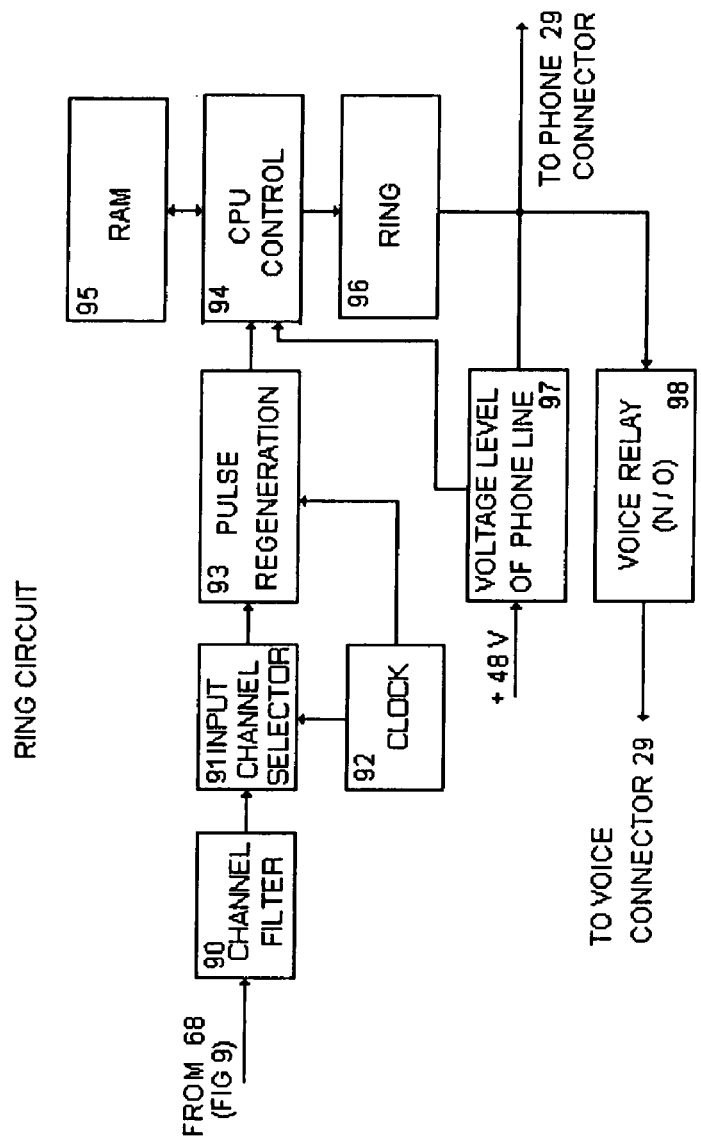
FIG. 15 illustrates the unitary remote 21 circuit responsible for ringing the telephone bell.

Note that, when a "ring" signal is generated at the PBX 13 (e.g., by sending a conventional 20 Hertz 86 volt signaling current as is commonly done) that signaling voltage from the PBX 13 could be directly translated into its digital representation, sent to the proper room on the designated channel, and reconverted to a voltage. However, in the preferred embodiment PCM slot 16—which has traditionally been set aside as an "alarm" channel—will be used to signal that a phone in a particular room is to be rung. As is best illustrated in FIG. 15, the instant inventor anticipates that when a ring signal is generated at the PBX 13, the PCM will respond by placing the ringing telephone line number (i.e., PCM slot number) into PCM slot 16. Note that under this arrangement, only one of the rooms that is in communication with this PCM generator 37 can be "rung" at a time. Now, on the room end (FIGS. 9, 15, and 18), the unitary remote module 21 in the appropriate room responds to the error condition in the alarm channel and activates an internal "ring" circuit 96 (FIG. 15), which ring circuit 96 is a conventional circuit well known to those skilled in the art. The circuit 96 then causes the in-room telephone 34 to ring, thereby signaling to the room resident that an in-coming call is on the line.

When the room occupant picks up the receiver and begins to speak, the voltage level of the phone line will drop from +48 V to +6V, thereby signaling to the unitary remote unit 21 (via module 97) that the handset has been lifted and the ringing may stop. The handset microphone converts the spoken words to an analog signal which is transmitted via the phone cord 35 back to the unitary module 21. Inside that module, the analog signal is received through modular phone connection 29 and converted from analog to digital within the audio channel processing circuitry module 65. Within that module, PAM is preferably used to digitize the incoming signal and send the digital information on to PCM channel selector 63. Within PCM channel selector 63, the digitized information is converted to a multiplexed serial PCM format, with the digital information from this phone going into one particular predefined PCM slot. One purpose of this arrangement is so that, on the other end, the receiving hardware will recognize—because of the PCM slot/channel combination containing the digital information—which room the digital information is coming from. The channel generator 62 modulates the serial PCM signal for transmission out over the coax backbone 18. In the preferred embodiment, the returning information will be modulated so that it falls somewhere within the 5 MHz to 48 MHz frequency interval. This range of frequencies is below the bandwidth used by conventional broadcast televisions channels and, thus, would not normally interfere with the transmission of that information.

The output from the channel generator 62 is next passed to a band pass filter 61, which filter 61 attenuates frequencies outside of the 5–48 MHz band. After filtering, the signal is returned to bi-directional mixer 55 where it reenters the coax backbone 18 through cable connection 27. As is made clear in FIG. 9, this entire process is synchronized via clock 65.

The modulated PCM voice signal from the room is then broadcast over the coax backbone 18. The returning signal is boosted by the "return" branch of amplifier 17, which amplifier operates only on frequencies in the 5–48 MHz range. Frequency splitter 10 separates out those frequencies in the 5–48 MHz range from the coax by applying a high-cut (i.e., greater than 48 MHz) filter to the signal. This will tend to attenuate the broadcast television signals, as well as the PBX-to-room voice phone signals. Those skilled in the art will recognize that the choice of the particular frequencies that are used to send and receive information are not important to the operation of the instant invention. That being said, it is preferred that all of the sending frequencies lie somewhere within the conventional television bandwidth and all of the receiving frequencies lie to lie outside of that bandwidth.

Figure 11:
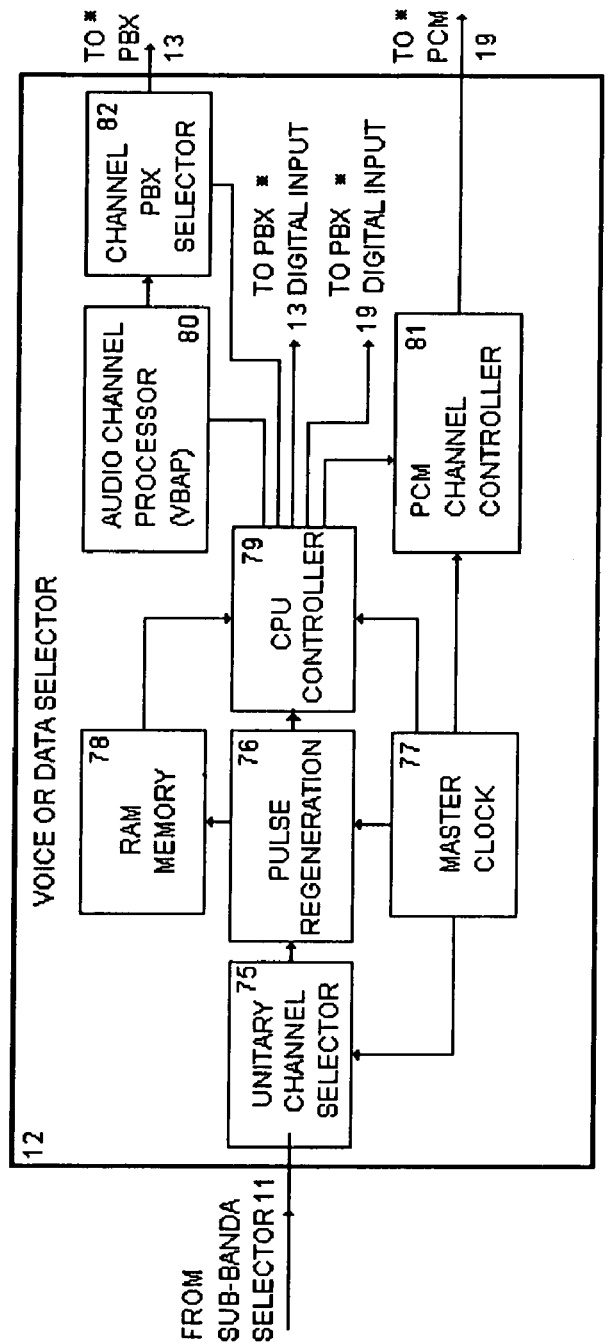
FIG. 11 contains a more detailed illustration of the various components of the voice/data selector 12.

The modulated PCM voice information is next sent to the sub-band selector module 11, the purpose of which is to demodulate and demultiplex the PCM serial information. The demultiplexed signals from the sub-band selector module 11 are then transferred over multiple lines to the voice/data selector 12 (FIG. 11). In the case of voice information, the voice/data selector 12 passes that information unchanged to the PBX 13 for transmission over the public telephone network 14, as is illustrated in FIG. 11. In that figure, note that the CPU controller 79 has a variety of outputs. Depending on the nature of the PBX 13, the output may either be digital or analog. If the PBX 13 is analog, the output from CPU 79 goes through audio channel processor (VBAP) 80. If the PBX 13 is digital, the digital voice information will be sent directly to it. Alarm handling will be discussed below.

Figure 19:
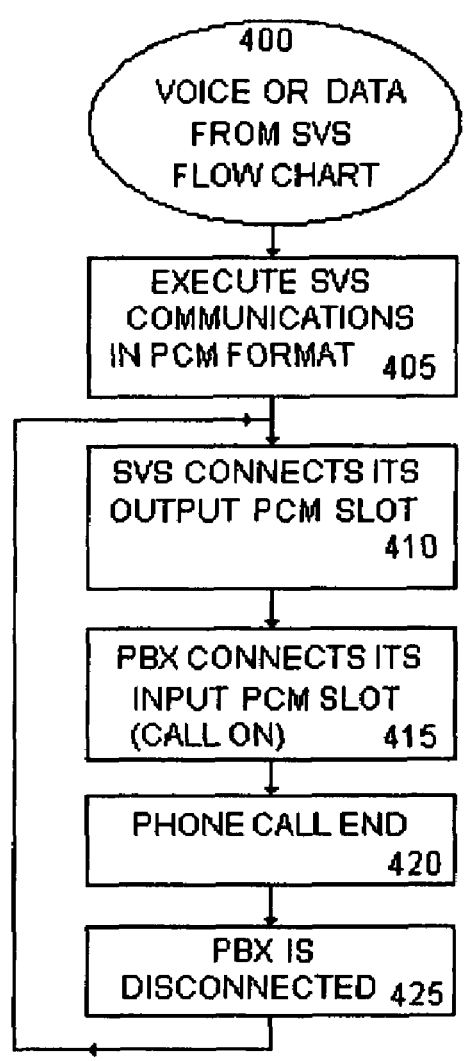
FIG. 19 illustrates the main logic steps in the sending of voice/data information from the unitary module 21 back to the PBX 13.

An out-going call may be originated in a room as follows. First, and as is generally illustrated in FIG. 19, the handset is lifted from the telephone 34, by the lodger thereby initiating an "off-hook" signal, which signal normally takes the form of a voltage drop as measured across the conductors in the telephone cord 35 in FIG. 6. The unitary remote module 21 senses this voltage drop and sends a corresponding "off-hook" signal via PCM to PBX 13. The PBX 13 receives this signal and responds to it by returning a dial-tone via the same PCM means. The room resident may then interact with the PBX 13 normally.

Note that, although the previous discussion has been in terms of voice signals only, it is well known to those skilled in the art that conventional fax machines, modems, etc., could also be attached at the room-end of the instant invention and those devices could would be able to utilize the digital voice transmission/reception features of the instant embodiment.

Video/Data Communications

Turning now to a second aspect of the present invention, there is provided a method and apparatus for sending black and white video information from a central location to a particular room over a coax network without making that information generally available to the other rooms. In more particular, this embodiment provides a way for a front desk to securely send information such as the current bill status of a resident to a single room over a coax network.

Turning first to FIG. 1 wherein the instant embodiment is broadly illustrated, there is provided a CPU 5 which contains graphical information that is to be transmitted to a specific room within the hotel. By way of explanation, the graphical information will probably include text such as billing information, but that is not required. The instant embodiment is designed to work with any black-and-white screen display from the head-end whether it contains text, graphics, or some combination.

In brief, the instant embodiment broadcasts a video signal representative of a particular screen display out over the coax backbone 18. However, before it is transmitted a "security key" is impressed into a non-visible video scan line. This key is tied to a particular in-room unit 21 and only that unit is authorized to store and provide for later viewing of that information.

In FIG. 1, the information that is to be transmitted over the coax backbone 18 is originally resident within CPU 5. This information might take many forms, but in the preferred embodiment it would be information designated for a single remote unitary module 21, such as billing information. Additionally, the data could consist of general information related to activities at the facility, the current weather conditions, etc. More broadly, any information that can be written to or drawn upon a monochrome (black and white) computer monitor would be suitable for use with the instant embodiment. In the text that follows, the word "written" will be used to apply both to information that has been actually written as well as graphical information that has been drawn upon the computer screen, as both of those terms are used in the art.

Assuming for the moment that only a single screen image is to be transmitted, the information that is to be sent to a room is preferably first written to some area of video RAM within the computer 5. Alternatively, the information could be written directly to the video encoder card 90 which might be either incorporated within the computer 5 or added as a peripheral device thereto in the form of an add-on card. As part of the process of preparing the image for transmission a "security key" is inserted into the first scan line of the image. In more particular, and as is generally illustrated in FIG. 4, it is well known to those skilled in the art that a computer screen image is typically nothing more than a video representation of an area of video RAM within the computer. The numerical values stored in the video RAM determine the appearance of the screen image, with a particular RAM location defining the appearance of each "pixel" on the screen. In the case of a black-and-white image, the pixels may be represented within memory as a collection of "bits," wherein bits taking the value of "1" are "lighted" on the screen and bits taking the value "0" are dark.

It is also well known that when the video RAM contents are converted to video, the resulting video format is often that of VGA, as that acronym is known in the art. A VGA image is normally described as having a resolution of 480 (vertical) by 640 pixels (horizontal), whereas the NTSC or standard broadcast video signal format has a nominal vertical resolution of 525 lines, 490 of which are actually visible on the screen. The remaining non-visible scan lines are available for other uses.

Figure 3:
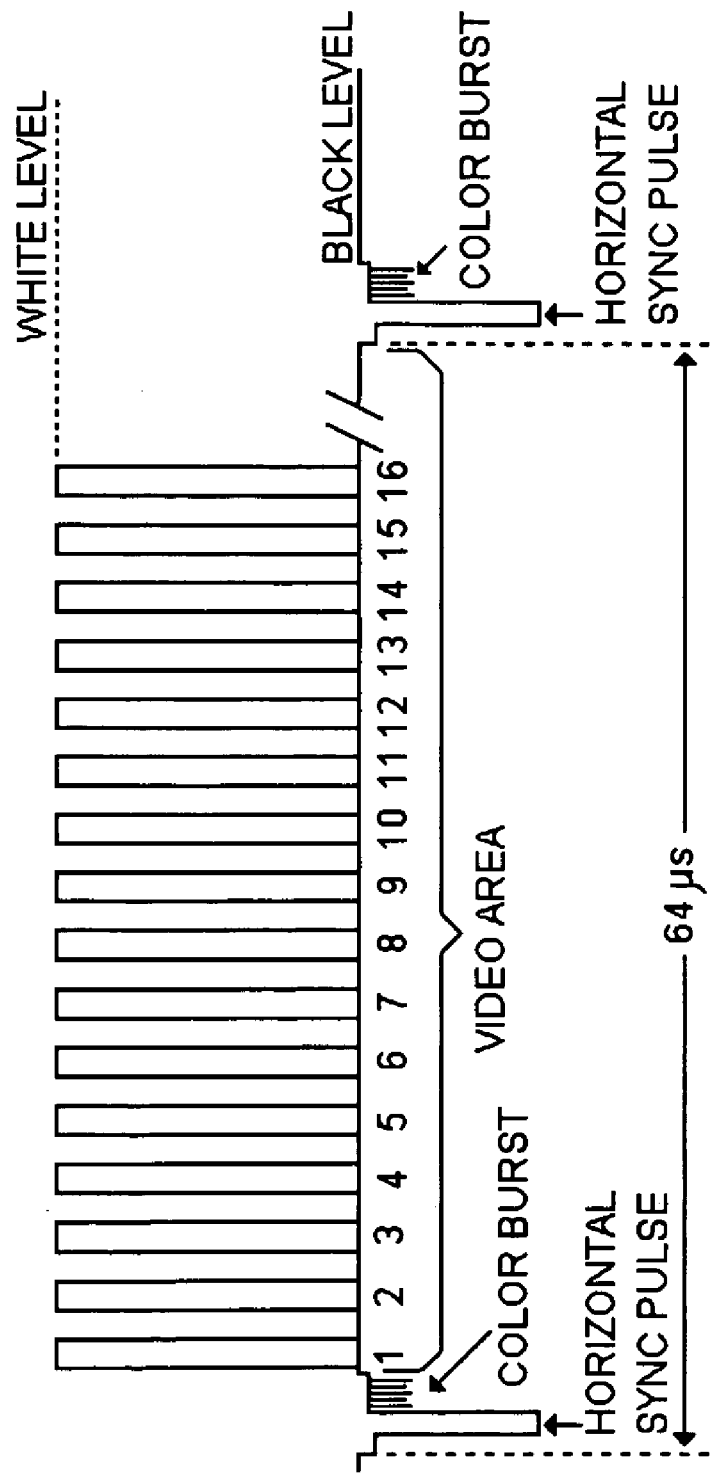
FIG. 3 contains a diagram of a typical video signal illustrating how each white pixel in a bit mapped image corresponds to a particular voltage in the scan.

The video signal that represents a monochrome image has a particularly simple format—a format that is exploited to advantage by the instant inventor. As is generally illustrated in FIG. 3, this sort of video signal is characterized by voltage changes that alternate between a maximum voltage (a "white" pixel) and a minimum voltage (a "black" pixel). Although no black pixels are specifically exhibited in FIG. 3, those skilled in the art will recognize how that figure could be modified to display such (i.e., by reducing any white pixel voltage to the "black" voltage level). In essence, for a black and white image the portion of the video signal following the colorburst is a binary signal that will require only minimal circuitry on the receiving end to decode. In more particular, on the receiving end, i.e., within the unitary remote module 21, the receiver does not require a conventional A/D converter in order to digitize the transmitted video signal. It is sufficient to provide a simple voltage sensing circuit which sends a "1" to CPU 49 if the baseband video signal voltage is "high" and a "0" if it is "low." That being said, the instant invention is not limited in application to the transmission of black-and-white images—although that is the preferred image type—as will be described hereinafter.

Now, before transmitting an image out over the coax backbone 18 to a particular room, the first line of the image as it exists in computer RAM is altered through the insertion of a room "security key". As is broadly illustrated in FIG. 4, in the preferred embodiment the first eight bits of the first scan line of the image are changed by inserting an eight-bit room key which is uniquely associated with a particular room in the complex. This will have no effect on the displayed room image, because the first 15 or so VGA scan lines will not appear after the image is converted to an NTSC format. This manipulation is done within computer 5 before, during, or after the designated image is written to video RAM.

As another step in the preparation of an image for transmission, a display channel number is impressed into the first scan line. As is illustrated in FIG. 4, bit numbers 12 and 13 of the first scan line are used to specify the television "channel" on which this particular screen image is to be displayed. This allows different screen images to appear on different television channels: hotel events on one channel, the resident's room bill on another, phone messages on another, the current weather on another, etc. In the preferred embodiment only two "bits" are allocated to this variable, meaning that four "channels" may be specified, however those four channels may be arbitrarily selected from the available standard video channels. By way of example, the bit combination "00" could be assigned to television channel 12, the bit combination "01" could be assigned to television channel "39", etc. Of course, many other arrangements are certainly possible.

Multi-page images are prepared for transmission as follows. In the preferred embodiment, the number of pages that are a part of each transmission are encoded as part of the first scan line. In FIG. 4, additional "bits" are allocated within the first scan line (bits 14–16) to indicate how many pages are being sent to this room in this transmission. These three bits are interpreted as a binary number so that the bit combination "101" indicates that five pages are being transmitted. It is expected that a multiple page display will be transmitted one page after another as quickly as the page displays can be created. Of course, other possibilities are certainly possible.

Needless to sat, the aforementioned bit-allocation scheme is just one of many that might be used in conjunction with the instant invention. The inventor specifically contemplates that the precise number, position, and interpretation of these bits will potentially vary depending on the particular needs of the building in which the invention is installed and the particular use to which the instant invention is put.

The output of encoder 90, being a base-band NTSC video signal, is sent to modulator 3 where it is modulated to a predetermined frequency that corresponds to an unused video channel. The output from modulator 3 is then passed to mixer 6 via input 9 for broadcast over the coax backbone 18.

As has been discussed previously, the frequency splitter 10 is designed to pass all signals between 50 MHz and 890 MHz to power amplifier 16, where the signals are boosted and broadcast out over the backbone. Note that a complete screen image—including all graphics and text—may potentially be transmitted every ⅓₀ of a second, the length of time corresponding to the refresh rate of a typical monitor or television.

The now-broadcast signal is available to be read by every unitary remote module 21 attached to the coax cable. However, as disclosed in FIG. 7, the internal circuitry and logic of the unitary remote module 22 is such that only the module which has been assigned a security key matching the one impressed on the video image before its transmission will actually decode and store the signal. In FIG. 7, the coax line that is brought into the unitary remote module 21 through the connection 27 is split in two new lines: one line going to the television tuner 40 and the other going to the data tuner 42. The data tuner 42 is preset to receive only at the predetermined frequency to which the modulator 3 previously moved the baseband video signal. The output from tuner 42 is a baseband black-and-white video signal, which signal is next passed to CPU 49 and also to sync separator 44, wherein vertical and horizontal synchronization information is extracted and separated.

Figure 16:
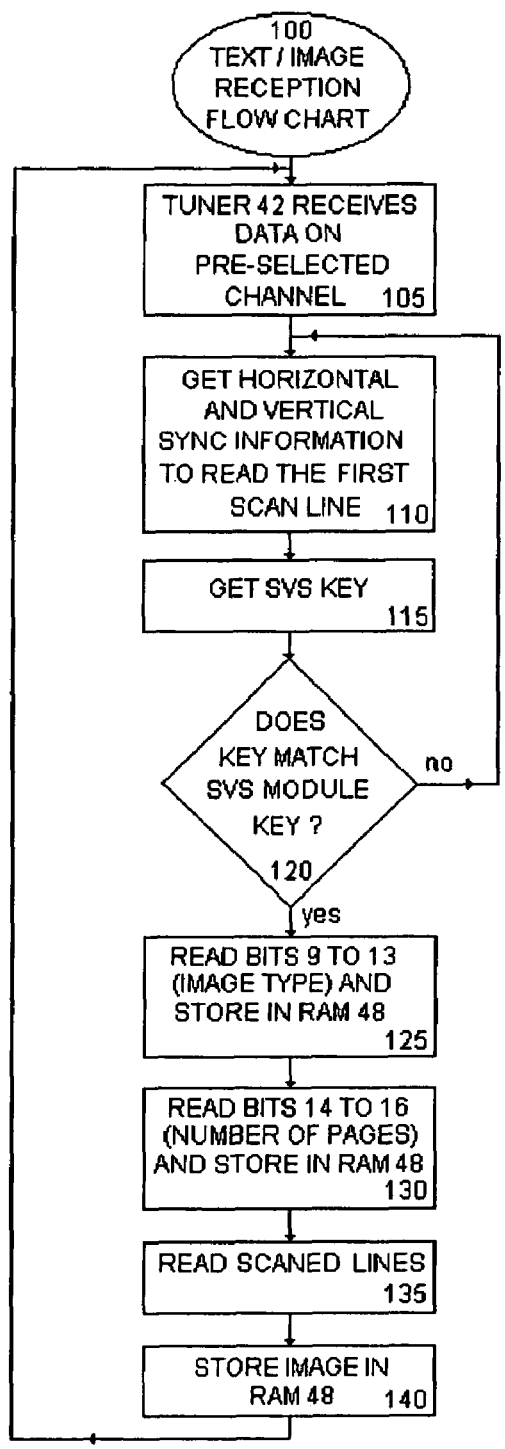
FIG. 16 is a flow chart that illustrates the principle steps in the text/image transmission process.

Within CPU 49 the baseband video signal from the tuner 42 and the video synchronization information from the sync separator 44 are used as follows (FIG. 16). First, the CPU 49 waits until a "top of video page" condition is sensed by the sync separator 44 (i.e., step 110), methods of recognizing this condition being well known to those skilled in the art. The line that immediately follows a "top of page" is the first scan line of the video display, the scan line in which a security key may have been impressed. The CPU 49 then is presented the first line of the video display, which it converts to a sequence of zeros and ones which correspond to pixels that were "on" or "off" in the original image. Note that since in the preferred embodiment the transmitted image video is black and white, the leading color burst information (see FIG. 3) may be ignored (but see below where the transmission of a color image is discussed). The first eight bits of the first line of this video image, having been converted to digital values and stored within CPU 49, are next examined to see if they match the unique security key assigned to this module 21 (FIG. 4 and step 115 of FIG. 16). If there is no match, the CPU 49 disregards the image data that follows and waits until another "first line" condition is signaled. Of course, it is possible to design keys that simultaneously either address all of the units (i.e., an "all send" key), or specific subgroups of the remote units 21, methods for doing so being well known to those skilled in the art.

On the other hand, if the first eight bits in the first scan line match the pre-assigned security key, the CPU 49 writes the digital image information to RAM 48 during the blanking (i.e., retrace) portion of the video signal and prepares to read and digitize the next scan line in the image as it is presented. Each scan line is successively converted to binary and written to the general RAM area 48 (step 140) until the entire screen image is captured and stored. Note that the NTSC standard requires that the scan lines be interlaced, so it will require two passes through memory—writing every other scan line each time—to store a complete image.

As discussed previously, some of the bits in the first scan line indicate the television channel on which the text is to be shown. This same variable is optionally used in the preferred embodiment to control the region of RAM 48 into which the information is to be stored (steps 125 and 130 of FIG. 16). This arrangement allows a room resident to view different multiple screens of information on each of the designated channels.

Figure 6:
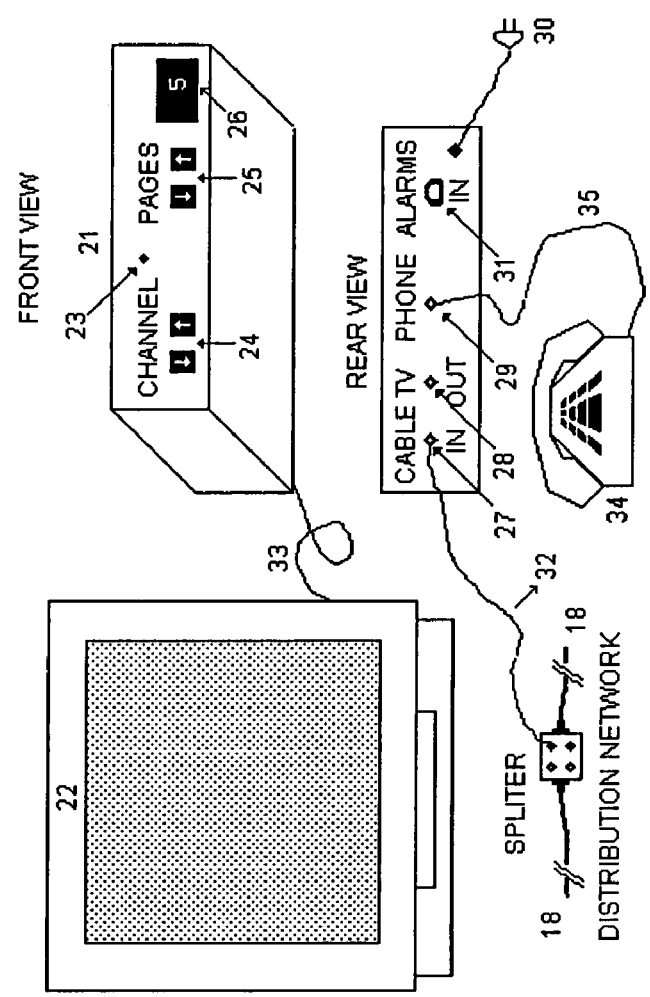
FIG. 6 is a diagram of the remote unitary remote module.

In practice and as illustrated in FIG. 21, the control of the in-room television 22 will preferably be handled by the unitary remote unit 21, which unit provides for two sorts of functions: conventional television viewing and viewing of information stored in video RAM 48. For purposes of conventional television viewing, it is preferred that the television 22 be kept permanently tuned to one particular channel, channel 3 hereinafter for purposes of illustration. When the lodger wishes to change the television channel, a tuner inside the unitary remote module 21 handles that function. Turning now to FIG. 6, notice that the front panel of the unitary remote module 21 has two sorts of buttons: channel 24 and page 25. When the room resident wishes to change the television 22 channel, he or she may use either the channel buttons 24 or a conventional infrared remote control, an infrared detector aperture 23 having been provided on the front panel of the unitary remote unit 21. In either case, and as illustrated in FIGS. 7 and 22, in normal television operation a request to change the channel of the unitary unit 21 is received by the infrared detector 41 and transmitted to the television tuner 40. The tuner 40—in a manner well known to those skilled in the art—extracts the video and audio signals corresponding to the selected channel (if there are such signals) and demodulates those signals into a baseband video signal and an audio signal for display on the in-room television 22. However, rather than having these signals pass directly though to the television, the signals are passed next to a video/audio switch 46. If the selected channel is one of the regular broadcast channels, the television video and audio information is passed directly through the video/audio switch 46, to the output tuner 50 (where it is modulated up to channel 3), and then on to the television 22.

On the other hand, if the selected channel is one of the "information" channels the steps discussed previously are modified as follows. First, note that all channel changes are communicated by the tuner 40 to the CPU 43. The CPU 43 has been preprogrammed to associate certain television channels with the display of information stored in the on-board RAM 48 area. By way of example, assume that channel 15 has been selected as the one that will display the lodger's current hotel bill and further assume that the information is currently available in RAM 48. Then, when the tuner 40 signals that the channel has been changed to 15, the CPU 43 will substitute a display of the information contained within RAM 48 for the broadcast television signal by, first, extracting the appropriate information from RAM 48 that is to be displayed when channel 15 is requested; second, by writing that binary information to a video controller which generates a baseband video signal; third, recombining that video signal with synchronization information from synchrony generator 43; and, finally, transmitting the video signal to the video/audio switch 46. The video/audio switch 46 is preferably under control of the CPU 43, which switches it between input sources depending on the channel setting. Of course, there is no audio information coming from the CPU 43, however, that is certainly a function that could be added without substantial modification of the existing structure.

If RAM 48 data are being displayed on the in-room television 22, the page buttons 25 on the front of the unitary unit 21 will become active and function as follows. As is broadly illustrated in FIG. 21, these two buttons provide a means for the user to instruct the unitary remote module 21 to display different portions of the information stored in its memory. By pressing the "up" and "down" page control buttons 25, the viewer can page through multi-page messages stored in RAM 48.

Figure 8:
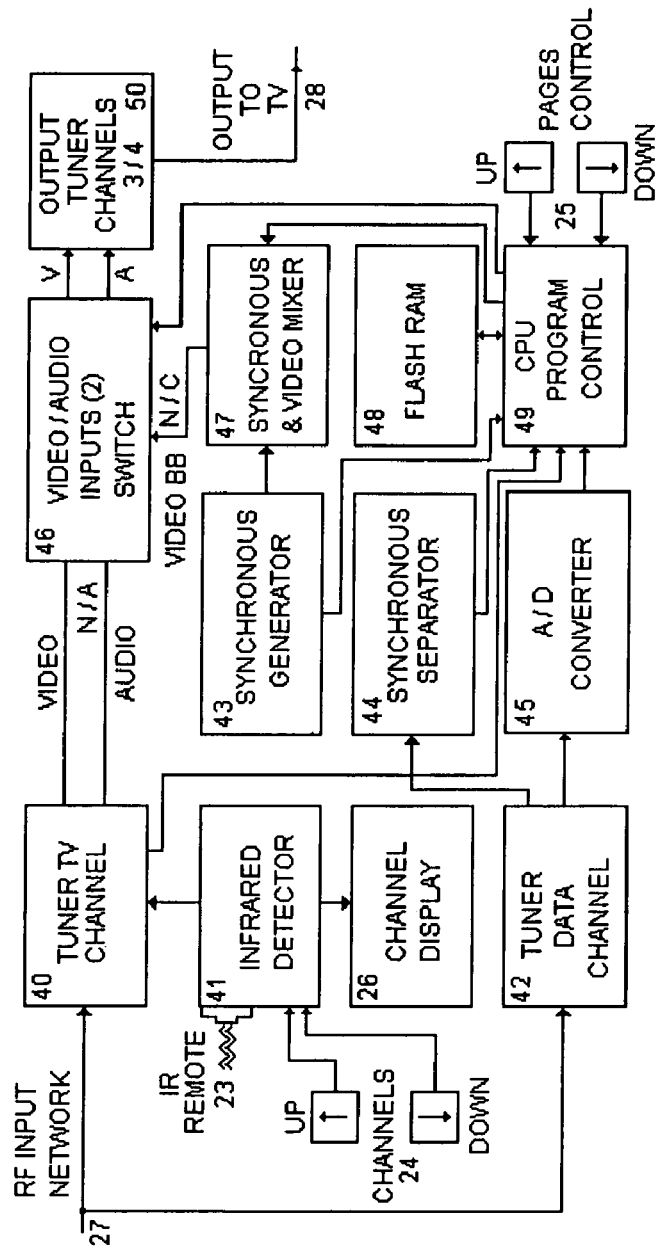
FIG. 8 is a schematic illustration of the color video channel control in the unitary remote module.
Figure 13:
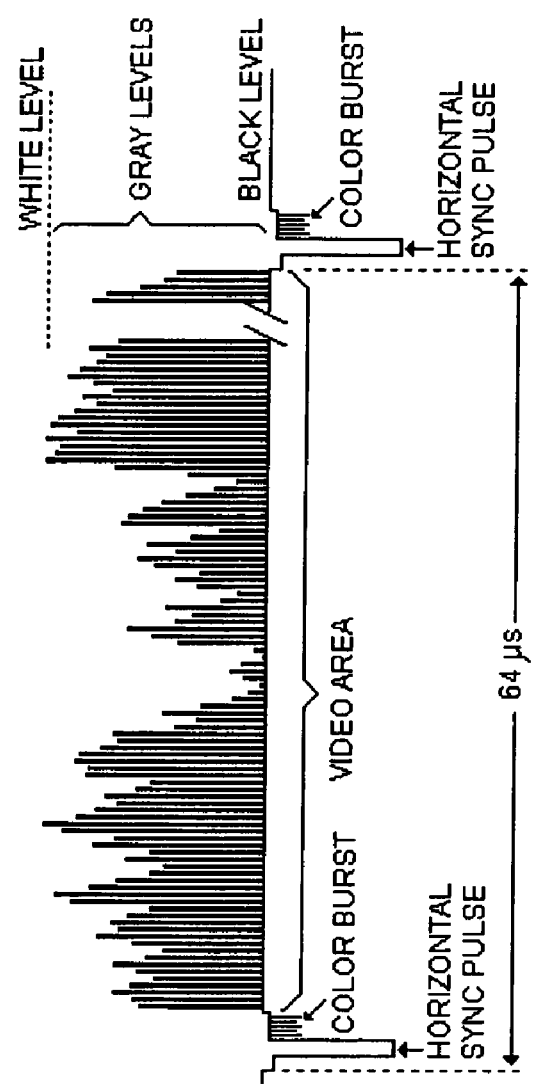
FIG. 13 contains a generalized diagram of a typical color video signal.

The video and logic circuitry discussed previously would need to be modified slightly if the transmitted video signal is a color image. Turning now to FIG. 8 wherein the modifications necessary to use a color signal are illustrated in some detail, note that the only change (as compared with FIG. 7) is the addition of an A/D converter 45. This component digitizes the baseband video signal from tuner 42 for presentation in numerical form to CPU 49. Those skilled in the art will know that a color video signal is generally of the form illustrated in FIG. 13 and contains a gray-level signal which is combined with the information from the color burst to produce a composite color image. Note first that the scheme for impressing a security key into the first scan line will work exactly as before, since the color burst information is ignored in that portion of the encoding process. Of course, a "white" pixel will now be decoded by the A/D converter 45 and represented as some arbitrary value, say 256, which value will be known by the CPU 49 to represent a "1" during the security key decoding process. The scan lines containing auxiliary encoded information will be processed similarly.

The remaining scan lines, including the color burst information, will be digitized and passed to the CPU 49. The CPU 49 will then digitally combine the color burst and gray scale information to arrive at a color and intensity for each pixel, methods for doing this being well known to those skilled in the art. The CPU 49 will then preferably use a pre-defined color look-up table ("CLUT") to assign a single integer value to each pixel, which integer value will then be stored in the appropriate region of RAM 48. When this information is later read for display on the television 22, the same CLUT will be used to give each pixel a corresponding color.

Pay-Per-View Movies

Figure 17:
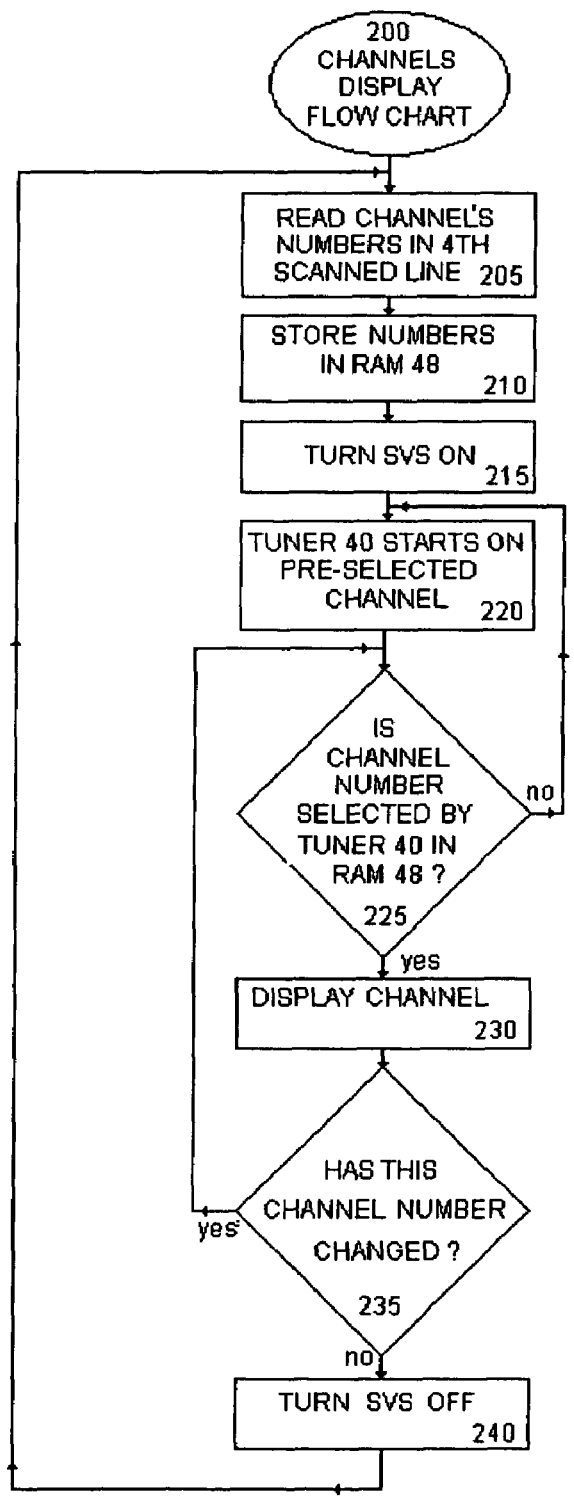
FIG. 17 illustrates the principal steps in the channel selection/display logic.

Those skilled in the art will recognize that control over which channels are displayed at the in-room television 22 has applications beyond that of providing access to personal information. According to a third aspect of the instant invention, and as is generally illustrated in FIGS. 7 and 17, there is provided a method and apparatus for controlling and delivering pay-per-view movies to a room. Until a room resident calls and requests access to a movie, the unitary remote module 21 would be programmed to display, say, the current weather conditions on the movie channel. Alternatively, a message might be displayed that announces that the selected channel is a pay-per-view channel and that directs the lodger to call the front desk to gain access. Thus, when the unitary remote module 21 senses a change in the tuner 40 to the pay-movie channel, it would be programmed to substitute some other video information—preferably information previously stored in its computer RAM 48—for the content of the movie channel (step 225 of FIG. 17), thereby blocking access by the room resident to that service. However, after the resident requests access, the hotel operator would send a command (steps 205 and 210)—preferably embedded as a binary code within one or more scan lines and keyed to that specific module—that directs the CPU 43 to stop blocking the movie channel and let that channel though to the television 22 (step 230).

There are still other ways to implement a pay-per-view type function using the same hardware. For example, rather than requiring the lodger to call the front desk to view a movie, the unitary remote module 21 could instead be programmed to sense when the television channel is tuned to a pay-per-view channel and, after displaying a screen that warns the lodger he or she is about to be charged, allow the appropriate video signal to pass through. The fact that the lodger has elected to view a pay channel would then be communicated back to the front desk, preferably by using the signalling methods discussed below (i.e., via an alarm). In any case, a central computer would then receive and interpret that alarm and add a charge to the appropriate room bill.

The preceding has discussed only two of the many ways that a pay-per-view function could be implemented by the instant invention. Those skilled in the art will recognize that many other approaches could be used instead.

In-Room Alarm Signals

Figure 9:
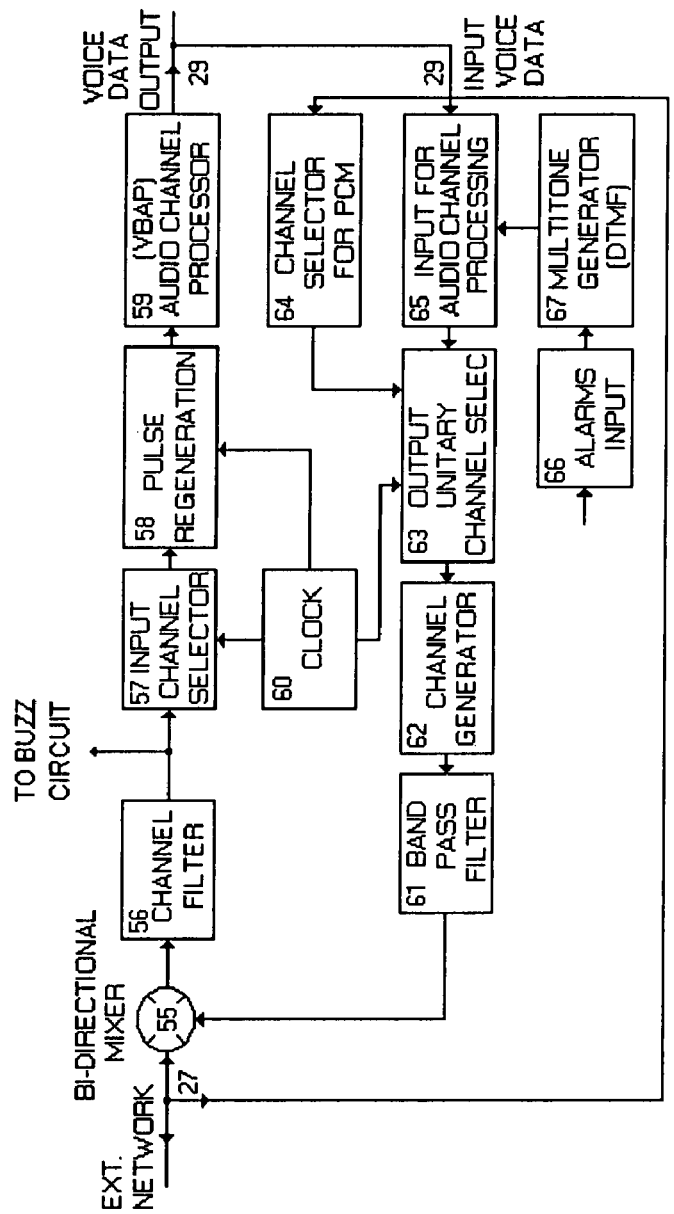
FIG. 9 contains a schematic illustration of the main functional elements of the room-end voice/alarm embodiment of the instant invention.
Figure 10:
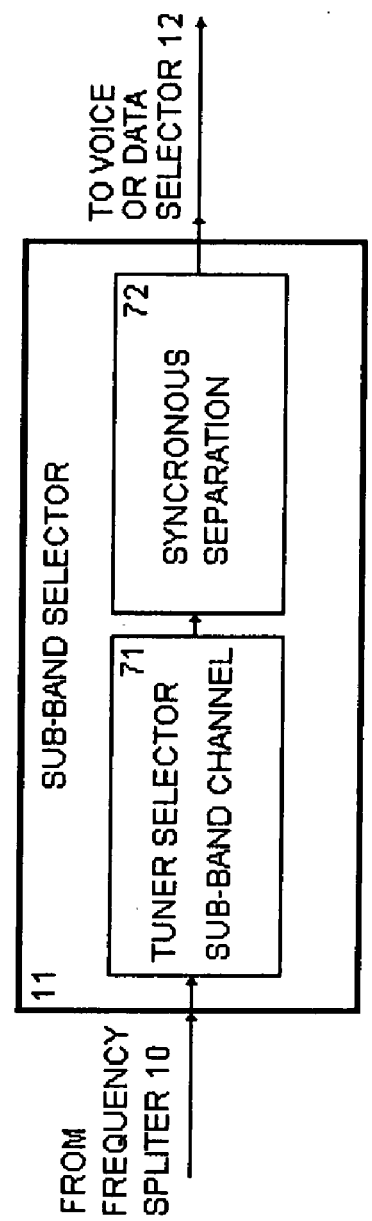
FIG. 10 illustrates in more detail the sub-band selector module 11.
Figure 20:
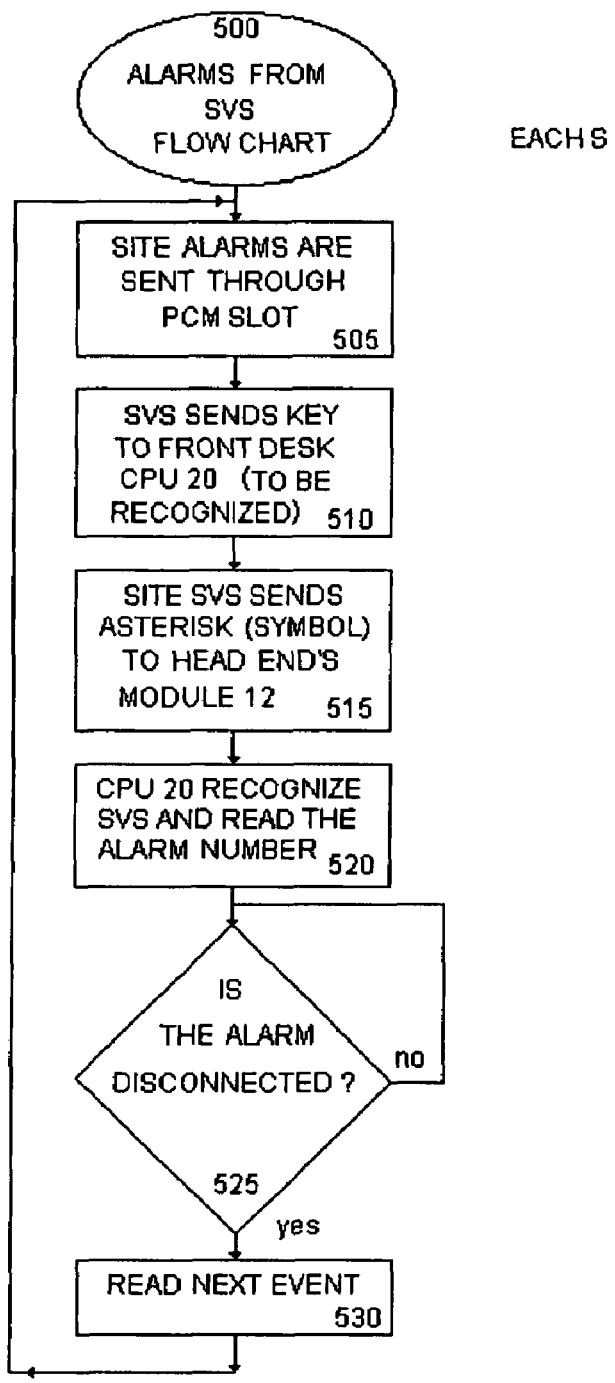
FIG. 20 contains a flow chart that illustrates the logic involved with the transmission of alarms from a remote location to a central monitoring unit using the unitary remote module 21.

Finally, according to a fourth aspect of the present invention, there is provided a method and apparatus for sending alarm signals from a motel room to a central monitoring facility over a coax-type cable without interfering with pre-existing video signals. Turning now to FIGS. 9, 11, and 20 wherein the principal features of the instant embodiment are illustrated, alarms input 68 is designed to monitor the status of one or more switches within the room in a manner well known to those skilled in the art. The switches might associated with any number of different in-room events including, for example, smoke detection, heat detection, open (refrigerator) door detection, "panic alarm" detection, or other binary swtiches. In the preferred embodiment there could be as many as 12 different kinds of "alarms" associated with each room, the number 12 coming from the preferred use of dual tone multi-frequency signaling ("DTMF" or the "touch tone" system) as that method is known and used in the industry, and as that term is defined in *The Telecommunications Fact Book and Illustrated Dictionary*, Ahmed S. Khan, Delmar Press, 1992, at page 47, the disclosure of which is incorporated herein by reference. DTMF signaling is so called because it uses combinations of two single-frequency tones (a low group tone and a high group tone) to indicate which element in a two-dimensional matrix has been selected. (By way of specific example, a conventional touch-tone phone has its buttons arranged in a three column by four row array. Pressing any button on the face of the phone generates a composite tone that is a combination of two single-frequency tones. The exact button that was pressed may be easily reconstructed by determining—via conventional techniques—the two frequencies that were combined to make the transmitted tone.)

The various alarms switches are connected to unitary remote unit 21 via connector 31. This connector 31 can accommodate up to about 14 sensors, depending on the exact hardware that is used. In the preferred embodiment, each sensor will typically be an "open/close" or an "on/off" type of switch.

Now, when alarm input 68 senses that an alarm condition has been generated (e.g., by closing an electrical circuit), the type of the alarm is determined. Built into alarm input 68 is a table that relates the different alarm types to one of the buttons on a touch-tone phone. This table contains arbitrary assignments and could easily be modified as needed. The alarm input 68 then directs the DTMF signaling module 67 to transmit two (not just one) characters: an asterisk followed by another digit (0–9, "*", or "#"), the second digit corresponding to the particular alarm condition detected. In the preferred embodiment, the asterisk tone (being a combination of a 941 Hz and a 1209 Hz signal) is used as an "attention" character to notify the receiving unit on the other end that an alarm condition is being transmitted. This arrangement is necessary because the room phone shares this same line and DTMF signals are routinely sent through the system for other reasons (e.g., the room resident is dialing the phone). Needless to say, other signaling schemes could easily be used, thereby increasing the number of types of alarm signals that could be generated. By way of example, the alarm input 68 could send an asterisk followed by two digits; an asterisk followed by a string of numbers and terminated by another asterisk; etc.

The two-character DTMF signal from module 67 passes into audio channel processing module 65, where it is handled just like out-going telephone voice signals or DTMF signals from the attached telephone. However, at the other end of the network, voice or data module 12 treats this signal somewhat differently as is illustrated in FIG. 11. In normal operations, CPU controller 79 passes all data (voice, DTMF, fax, etc.) through to the PBX 13. Before doing so, though, CPU 79 first sequentially checks each PCM slot for a DTMF asterisk. If that digital character is detected, that character—plus the character that follows—is sent also to data processing module 19 (FIG. 12) and then on to CPU 20. The computer 20 senses the characters and then notifies the operator, via any number of conventional means, that an alarm has been triggered and the room in which it was triggered. RAM 78 contains, among other things, a list of alarm codes and instructions for responding to each, which information is used by the CPU 79 in determining its response.

Note that the instant alarm function does not require that a telephone be present in the rooms in which an alarm switch has been installed: the alarm function is completely independent of the room phone. A separate DTMF signal generating unit is preferably made a part of the unitary remote module 21 so that it need not be placed near the room phone. Thus, this embodiment of the instant invention has application beyond use in a hotel room and can be installed where ever remote alarm detection is desired and where cable (or other video transmission means) is available.

Note that even though the previous language has been in terms of "alarms," the instant inventor contemplates that this system would also be used for general signals. For example, by attaching a signal unit to the door of an in-room refrigerator, it will be possible to know whether or not it has been opened and, thus, whether an accounting of the contents needs to be made before the boarder checks out of the hotel. Similarly, by providing a status switch within the room, a housekeeper can notify the front desk that a room has (or has not) been cleaned and is ready for occupancy.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of controlling access to a plurality of video channels that are distributed over a communications conduit, each of said video channels being associated with a video channel number,
   wherein there is provided a plurality of remote unitary modules for controlling access to said plurality of video channels,
      each of said plurality of remote unitary modules being provided with a changeable list of permitted video channel numbers, each of said changeable lists containing at least one permitted video channel number therein,
      each of said remote unitary modules having a unique identifier associated therewith, and,
   wherein the communications conduit has a head-end and at least one remote-end,
      said plurality of remote unitary modules being positioned along a remote-end of the communications conduit, and,
   wherein is provided an NTSC standard video signal transmitted over said communications conduit, said standard video signal containing at least one overscan scan line wherein at least a portion of said changeable list of permitted video channels has been embedded therein,
   said remote unitary module, comprising:
   (a) a first tuner in electronic communication with said communications conduit, said first tuner receiving a particular video channel as input and providing a baseband video signal as output, said particular video channel being associated with a particular video channel number;
   (b) means for changing said first tuner to receive a different video channel, said different video channel having a different video channel number;
   (c) a CPU in electronic communications with said fist tuner, said CPU programmed to at least perform the steps of,
      (c1) extracting from said at least one transmitted overscan scan lines said embedded module identifier;
      (c2) extracting from said at least one transmitted scan line at least a portion of said embedded portion of said changeable list of permitted video channels,
      (c3) sensing said different video channel number and determining whether said different video channel number is in said extracted changeable list of permitted video channel numbers, and,
      (c4) if said embedded module identifier matches said remote unitary module identifier, prohibiting display of said different video channel if said different video channel is not in said extracted changeable list of permitted video channel numbers;

(d) computer RAM in electronic communication with said CPU, said RAM containing,
   at least one digital image stored therein; and,
(e) a video switch having at least a first video input, a second video input, and a video output,
   wherein
   (e1) said first video input receives said baseband video signal from said first tuner,
   (e2) said second video input receives a baseband video representation of said digital image stored in said computer RAM, and,
   (e3) said video output is switchable under control of said CPU between said baseband video signal from said first tuner and said baseband video representation of said digital image,
wherein said method comprises the steps of:
(a) assigning an individual security key code to each of said plurality of remote unitary modules;
(b) identifying at least one of said plurality of remote unitary module that is to receive a changed list of permitted video channel numbers and identifying an individual security key code assigned to each of said identified remote unitary modules;
(c) obtaining a standard video image from a digital or an analog source, said video image having a plurality of scan lines contained therein;
(d) obtaining a first and a second predetermined scan line of said video image, wherein said first and second predetermined scan lines are within an overscan portion of said video image;
(e) for each of said identified remote unitary modules,
   (e1) forming a binary representation of said identified remote individual security key code,
   (e2) impressing said binary representation into said first predetermined scan line thereby creating a modified video image,
      wherein each "1" in said binary representation is associated with a first video grey level and each "0" in said binary representation is associated with a second video grey level, thereby forming a sequence of said first and said second grey levels within said first predetermined scan line associated with said binary representation of said identified remote unitary module;
(f) forming a binary representation of said changed list of permitted video channel numbers and impressing said binary representation of said changed list of permitted video channel numbers into said second predetermined scan line, thereby creating a further modified video image,
   wherein each "1" in said binary representation of said changed list of permitted video channel numbers is associated with said first grey level and each "0" in said binary representation is associated with said second grey level, thereby forming a sequence of said first and said second grey levels within said second predetermined scan line associated with said binary representation of said changed list of permitted video channel numbers;
(g) broadcasting said further modified video image over said communications conduit;
(h) receiving said broadcast video image within at least one of said at least one remote unitary modules;
(i) within at least one of said at least one remote unitary modules wherein said broadcast video image is received,
   (i1) determining a local security key code for said remote unitary module wherein said broadcast video image is received,
   (i2) identifying said predetermined scan line,
   (i3) extracting from said predetermined scan line any values representative of said assigned individual security keys impressed therein,
   (i4) determining from any values extracted from said predetermined scan line at least one transmitted individual security key,
   (i5) comparing each of said at least one transmitted security keys with said local individual security key,
   (i6) if said local individual security key is equal to any one of said at least one transmitted keys, storing within said selected remote unitary module a numerical representation of said changed list of permitted video channel numbers, and,
   (i7) performing steps (i1) through (i6) for at least one selected remote unitary module;
(j) monitoring said first tuner to detect whether the user has selected a different video channel number;
(k) determining whether said selected different video channel number is among said changed list of permitted video channel numbers;
(l) if said different video channel number is not among said changed list of permitted video channel numbers, displaying to the user an alternative video image for said different video channel; and,
(m) if said different channel number is among said changed list of permitted video channel numbers, displaying to the user said different video channel;
(n) if said different video channel number is not among said changed list of permitted video channel numbers, displaying to the user an alternative video image for said different video channel; and,
(o) if said different channel number is among said changed list of permitted video channel numbers, displaying to the user said different video channel.

2. A method of controlling access to a plurality of video channels that are distributed over a communications conduit according to claim 1, wherein said predetermined scan line is a first scan line of said video image.

3. A method of controlling access to a plurality of video channels that are distributed over a communications conduit according to claim 1, wherein said predetermined scan line is a non-visible scan line of said video image.

4. A method of controlling access to a plurality of video channels that are distributed over a communications conduit according to claim 1, wherein said first video grey level is a black video level and said second video gray level is a white video level.

5. A remote unitary module for controlling access by a user to a plurality of video channels that are distributed over a communications conduit,
   wherein said remote unitary module is provided with a changeable list of permitted video channel numbers, each of said permitted channel numbers being associated with one of said plurality of video channels,
   wherein is provided a standard NTSC video signal transmitted over said communications conduit, said video signal containing at least one scan line within an overscan portion of said video signal wherein at least a portion of a representation of a revised list of petted video channels is embedded as a first two-level video signal,
   wherein said video signal contains at least one scan line within said overscan portion of said video signal wherein a representation of a security key is embedded as a second two-level video signal, and, wherein said remote unitary module has a module security key associated therewith, said remote unitary module, comprising:

(a) a first video tuner in electronic communication with said communications conduit, said first tuner being configurable to accept at least two of said plurality of video channels as input, wherein, (a1) said first video tuner is switchable to receive a selected one of said at least two video channels, said selected video channel having a corresponding selected video channel number, (a2) said first video tune transmits a first tuner video signal as output, said first tuner video signal being representative of said selected video channel;

(b) a CPU in electronic communication with said first video tuner, said CPU being programmed to perform at least the steps of:

(b1) examining said video signal to obtain said representation of said security key from said first two-level video signal, (b2) examining said video signal to obtain said representation of said revised list of permitted video channels from said second two-level video signal, (b3) comparing said transmitted security key with said module security key, (b4) if said transmitted security does not match said module security key, responding according to said selected video channel to determine whether said selected video channel number is in said provided changeable list of permitted video channel numbers, and, (b5) if said transmitted security does match said module security key, (1) responding according to said selected video channel to determine whether said selected video channel number is in said revised list of permitted video channel numbers, and, (2) storing said revised list of permitted video channel numbers in place of said provided permitted video channel numbers;

(c) computer RAM in electronic communication with said CPU, said RAM containing at least one digital image stored therein;

(d) a video controller in electronic communication with said CPU and said RAM, said video controller having a video controller output for transmitting a controller video signal representative of at least one of said at least one digital images stored in said RAM;

(e) a video switch having at least a first video switch input, a second switch video input, and a video switch output, wherein (e1) said first video switch input receives said first tuner video signal from said first video tuner, (e2) said second video switch input receives said controller video signal from said video controller output, (e3) said video switch output is switchable under control of said CPU between said first tuner video signal and said controller video signal, depending on whether said selected video channel is a permitted video channel.

6. A remote unitary module for controlling access by a user to a plurality of video channels according to claim 5, wherein said first video tuner is switchable by the user to receive a selected one of said at least two video channels.

7. A remote unitary module for controlling access by a user to a plurality of video channels according to claim 5, wherein said computer RAM contains a plurality of digital images stored therein, and wherein said video controller successively displays selected ones of said plurality of digital images under control of said CPU.

8. A remote unitary module for controlling access by a user to a plurality of video channels according to claim 5, wherein said first tuner video signal is a baseband signal and said controller video signal is a baseband signal.

9. A remote unitary module for controlling access by a user to a plurality of video channels according to claim 5, wherein said controller video signal is generated at a same frequency as said output from said first video tuner.

10. A remote unitary module for controlling access by a user to a plurality of video channels according to claim 5, further comprising:

(f) a video display device positionable to be in electronic communication with said video switch output, said video display device for displaying in visually perceptible form a video signal from said output of said video switch.

11. A remote unitary module for controlling access by a user to a plurality of video channels according to claim 1, further comprising:

(f) a video modulator in electronic communication with said video switch output, said video modulator modulating a video signal from said output of said video switch to a predetermined video channel.

12. A remote unitary module for controlling access by a user to a plurality of video channels according to claim 5, wherein said first two-level video signal and said second two-level video signal are both black and white video signals.

13. A method of controlling access to a plurality of video channels that are broadcast over a communications conduit, each of said video channels being associated with a video channel number, and wherein is provided at least one remote unitary module as in claim 5 which is in electronic communication with said communications conduit and with said plurality of video channels, each of said at least one remote unitary modules having a security code associated therewith, comprising the steps of:

(a) identifying at least one of said at least one remote unitary module that is to receive a revised list of permitted video channel numbers;

(b) identifying a particular security key code assigned to each of said identified remote unitary modules;

(c) obtaining a video image from a digital or an analog source, said video image having a plurality of scan lines contained therein;

(d) selecting a first scan line of said video image;

(e) storing a value representative of each of said identified particular security key codes into said first scan line, thereby creating a modified video image;

(f) selecting a second scan line of said video image;

(f) storing values representative of said revised list of permitted video channel numbers into said second predetermined scan line, thereby creating a further modified video image;

(h) broadcasting said further modified video image as a standard video signal over said communications conduit;

(i) receiving said broadcast video image within a particular remote unitary module, said particular remote unitary module having a particular security key associated therewith;

(j) within said particular remote unitary module,
- (j1) extracting from said first scan line at least one of said values representative of said assigned individual security keys stored therein,
- (j2) determining from any of said extracted values representative of said assigned individual security keys at least one of said identified security keys,
- (j3) comparing any of said determined identified security keys with said particular security key of said particular remote unitary module,
- (j4) if said particular security key matches any of said determined identified security keys, storing within said particular remote unitary module a numerical representation of said revised list of permitted video channel numbers,
- (j5) monitoring said first tuner within said particular remote unitary module to detect when the user has selected a video channel number,
- (j6) determining whether said selected video channel number is among said revised list of permitted video channel numbers,
- (j7) if said selected video channel number is among said revised list of permitted video channel numbers, displaying to the user said selected video channel, and,
- (j8) if said selected video channel number is not among said revised list of permitted video channel numbers, displaying to the user an alternative video image.

14. A method according to claim 13, wherein said first scan line and said second scan line are a same scan line.

15. A method according to claim 13, wherein said first scan line and said second scan line are both non-visible scan lines.

* * * * *